US007840331B2

(12) United States Patent
Yoshioka et al.

(10) Patent No.: US 7,840,331 B2
(45) Date of Patent: Nov. 23, 2010

(54) TRAVEL SUPPORT SYSTEM AND TRAVEL SUPPORT METHOD

(75) Inventors: Mototaka Yoshioka, Osaka (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 144 days.

(21) Appl. No.: 12/095,102

(22) PCT Filed: Oct. 31, 2007

(86) PCT No.: PCT/JP2007/071188

§ 371 (c)(1),
(2), (4) Date: May 27, 2008

(87) PCT Pub. No.: WO2008/053912

PCT Pub. Date: May 8, 2008

(65) Prior Publication Data

US 2009/0248284 A1 Oct. 1, 2009

(30) Foreign Application Priority Data

Nov. 2, 2006 (JP) ............................ 2006-299538

(51) Int. Cl.
*B60T 7/12* (2006.01)
*G06F 7/00* (2006.01)
*G06K 9/00* (2006.01)
*G08G 1/123* (2006.01)

(52) U.S. Cl. ........................ 701/96; 701/36; 382/104; 340/995.13

(58) Field of Classification Search ......... 701/117–119, 701/301, 200–226, 300, 84
See application file for complete search history.

(56) References Cited

U.S. PATENT DOCUMENTS 5,875,183 A * 2/1999 Nitadori ...................... 370/328

(Continued)

FOREIGN PATENT DOCUMENTS

JP 2004-157032 6/2004

(Continued)

OTHER PUBLICATIONS

International Search Report issued Feb. 5, 2008 in the International (PCT) Application of which the present application is the U.S. National Stage.

*Primary Examiner*—Jack Keith
*Assistant Examiner*—Muhammad Shafi
(74) *Attorney, Agent, or Firm*—Wenderoth, Lind & Ponack, L.L.P.

(57) ABSTRACT

The invention is a travel support system using notified non-equipped vehicle information, and including an equipped-vehicle detecting unit detecting a presence and a position of an vehicle equipped with a communication module for communicating with another vehicle, a non-equipped-vehicle detecting unit detecting a presence and a position of a non-equipped vehicle without any communication module, and an information-holding vehicle identifying unit identifying an information-holding vehicle that is the equipped vehicle and holding non-equipped-vehicle information including the position of the non-equipped vehicle, based on the position of the equipped vehicle and the position of the non-equipped vehicle. The system also includes a non-equipped-vehicle information providing unit providing the non-equipped-vehicle information for the identified information-holding vehicle, and a communicating unit holding the provided non-equipped-vehicle information and providing the held non-equipped-vehicle information for another equipped vehicle via the communication module of the identified vehicle.

8 Claims, 36 Drawing Sheets

U.S. PATENT DOCUMENTS

| | | | |
|---|---|---|---|
| 6,707,378 B2 * | 3/2004 | MacNeille et al. | 340/435 |
| 7,613,327 B2 * | 11/2009 | Stam et al. | 382/104 |
| 2004/0096084 A1 * | 5/2004 | Tamoto et al. | 382/104 |
| 2004/0193372 A1 * | 9/2004 | MacNeille et al. | 701/213 |
| 2005/0225457 A1 * | 10/2005 | Kagawa | 340/995.13 |
| 2006/0122750 A1 * | 6/2006 | Choi et al. | 701/36 |
| 2006/0235597 A1 * | 10/2006 | Hori et al. | 701/96 |
| 2007/0054685 A1 * | 3/2007 | Kellum | 455/517 |
| 2007/0100537 A1 * | 5/2007 | Parikh et al. | 701/117 |

FOREIGN PATENT DOCUMENTS

| | | |
|---|---|---|
| JP | 2004-295178 | 10/2004 |
| JP | 2005-285135 | 10/2005 |
| JP | 2006-048285 | 2/2006 |
| JP | 2006-153463 | 6/2006 |
| JP | 2006-185136 | 7/2006 |
| JP | 2006-293491 | 10/2006 |

* cited by examiner

FIG. 5

(a) Detection of position information

| Vehicle ID | Position information | Moving direction | Speed |
|---|---|---|---|
| 001 | E135. 30. 10, N35. 11. 10 | West | 50km |
| 002 | E135. 30. 13, N35. 11. 15 | North | 40km |

(b) Image recognition

| Recognition ID | Position information | Moving direction | Speed |
|---|---|---|---|
| 101 | E135. 30. 10, N35. 11. 10 | West | 50km |
| 102 | E135. 30. 13, N35. 11. 15 | North | 40km |
| 103 | E135. 30. 15, N35. 11. 10 | West | 50km |

(c) Non-equipped vehicle

| Recognition ID | Position information | Moving direction | Speed |
|---|---|---|---|
| 103 | E135. 30. 15, N35. 11. 10 | West | 50km |

FIG. 6

Detection of position information

| Vehicle ID | Position information | Moving direction | Speed |
|---|---|---|---|
| 001 | E135. 30. 10, N35. 11. 10 | West | 50km |
| 002 | E135. 30. 13, N35. 11. 15 | North | 40km |

(a)

Non-equipped vehicle

| Recognition ID | Position information | Moving direction | Speed |
|---|---|---|---|
| 103 | E135. 30. 15, N35. 11. 10 | West | 50km |

(b)

Non-equipped vehicle

| Recognition ID | Relative position | Speed |
|---|---|---|
| 103 | 125 meters backward | 50km |

(a) Detection of position information

| Vehicle ID | Position information | Moving direction | Speed |
|---|---|---|---|
| 001 | E135. 30. 05, N35. 11. 10 | West | 50km |

(b) Non-equipped vehicle

| Recognition ID | Relative position | Speed |
|---|---|---|
| 103 | 125 meters backward | 50km |

FIG. 22

(a) Movement history

| History ID | Departure point | Route | | | | | | | | | Destination |
|---|---|---|---|---|---|---|---|---|---|---|---|
| 001 | N201 | N202 | N203 | N204 | N205 | N206 | N207 | N208 | N209 | N210 | ... | N220 |
| 002 | N220 | N215 | N214 | N213 | N212 | N211 | N195 | N194 | N193 | N192 | ... | N190 |
| .. | .. | .. | .. | .. | .. | .. | .. | .. | .. | .. | .. | .. |

(b) Moving route until today

| Departure point | Route | | | | |
|---|---|---|---|---|---|
| N201 | N202 | N203 | N204 | N205 | N206 |

(c) Future moving route

| N207 | N208 | N209 | N210 | ... | N220 |
|---|---|---|---|---|---|

| Vehicle ID | Position information | Moving direction | Speed |
|---|---|---|---|
| 001 | E135. 30. 10, N35. 11. 10 | West | 50km |
| 002 | E135. 30. 13, N35. 11. 10 | West | 50km |

(b)

| Recognition ID | Position information | Moving direction | Speed |
|---|---|---|---|
| 101 | E135. 30. 10, N35. 11. 10 | West | 50km |
| 102 | E135. 30. 13, N35. 11. 10 | West | 40km |
| 103 | E135. 30. 15, N35. 11. 10 | West | 50km |

(c)

| Recognition ID | Position information | Moving direction | Speed |
|---|---|---|---|
| 103 | E135. 30. 15, N35. 11. 10 | West | 50km |

TRAVEL SUPPORT SYSTEM AND TRAVEL SUPPORT METHOD

BACKGROUND OF THE INVENTION

1. Field of Invention

The present invention relates to a travel support system which supports safety traveling of vehicles through communication between a large number of vehicles, the travel support system notifies information about a non-equipped vehicle which is not equipped with a communication module. The present invention particularly relates to a travel support system including a mobile terminal such as a car navigation system (hereinafter, a car navigation).

2. Description of the Related Art

A large number of systems for supporting safety traveling in which vehicles communicate with each other about their positions and movements, or vehicle-to-vehicle communication systems have been disclosed. In the vehicle-to-vehicle communication technique, vehicles equipped with a communication module (hereinafter, referred to as an equipped vehicle) communicate with each other about position information and the like. Therefore, the vehicle-to-vehicle communication technique is unavailable for a vehicle equipped with no communication module (hereinafter, referred to as a non-equipped vehicle). In response to this situation, there is a system for avoiding a collision with a non-equipped vehicle. In this system, a vehicle equipped with a communication module recognizes a non-equipped vehicle by using a camera mounted on the equipped vehicle, and then makes a notification to an oncoming vehicle ready to turn to the right at an intersection (Patent Reference 1). According to this system, since the equipped vehicle is notified that the non-equipped vehicle is present at the intersection, the equipped vehicle can know the presence of the non-equipped vehicle, such as a motorbike hidden behind an oncoming vehicle traveling straight head through the intersection. This can avoid a collision which may occur when a vehicle turns to the right.

There is another system for avoiding a collision. In this system, an estimate is made that, between equipped vehicles, a non-equipped vehicle whose moving direction is the same as the equipped vehicles, is present at a predetermined position. This estimated information is transmitted to another equipped vehicle (Patent Reference 2).

Patent Reference 1: Japanese Unexamined Patent Application Publication No. 2004-295178.

Patent Reference 2: Japanese Unexamined Patent Application Publication No. 2006-185136.

BRIEF SUMMARY OF THE INVENTION

However, in the conventional technique (Patent Reference 1), there is a problem as to whether the equipped vehicle notified of the presence of the non-equipped vehicle keeps holding the notified non-equipped vehicle information. The non-equipped vehicle information is not always useful for the further travel of the notified equipped vehicle.

Furthermore, in the conventional technique (Patent Document 2), in the case where the equipped vehicles have no external recognition unit such as a vehicle-mounted camera, the estimate is made that the non-equipped vehicle is present in the same moving direction, only based on predetermined conditions. This estimate lacks reliability.

It is an object of the present invention to provide a travel support system and a travel support method available in a variety of situations, in which (i) a roadside apparatus placed on an intersection or the like recognizes a non-equipped vehicle, (ii) identification is made as to which equipped vehicle holds the information about the non-equipped vehicle, and (iii) the identified equipped vehicle holds the non-equipped vehicle information to notify the non-equipped vehicle information.

In order to solve the problem, the travel support system according to the present invention supports traveling of a vehicle through communication between the vehicles, and includes: an equipped-vehicle detecting unit that detects presence and a position of an equipped vehicle equipped with a communication module for communicating with an other vehicle; a non-equipped-vehicle detecting unit that detects presence and a position of a non-equipped vehicle that is not equipped with a communication module for communicating with an other vehicle; an information-holding vehicle identifying unit that identifies an information-holding vehicle that is the equipped vehicle and that is to hold non-equipped-vehicle information including the position of the non-equipped vehicle, based on the position of the equipped vehicle detected by the equipped-vehicle detecting unit and the position of the non-equipped vehicle detected by the non-equipped-vehicle detecting unit; a non-equipped-vehicle information providing unit that provides the non-equipped-vehicle information for the information-holding vehicle identified by the information-holding vehicle identifying unit; and a communicating unit that holds the non-equipped-vehicle information provided by the non-equipped-vehicle detecting unit, and that provides the held non-equipped-vehicle information for an other equipped vehicle via the communication module of the identified vehicle, the communicating unit being included in the information-holding vehicle.

It is to be noted that the present invention can be implemented not only as an apparatus, but also as a method using processing units included in the apparatus as steps, as a program causing a computer to execute such steps, as a computer-readable recording medium that stores the program, such as a CD-ROM, and as information, data, or a signal representing the program. Such information, data, or a signal may also be distributed via a communication network, such as the Internet.

In the travel support system according to the present invention, the equipped vehicle notified of the non-equipped vehicle information (information-holding vehicle) further provides the non-equipped vehicle information held by the equipped vehicle, to another equipped vehicle. The presence of the non-equipped vehicle can be notified to a larger number of equipped vehicles. This can avoid a collision between each equipped vehicle and the non-equipped vehicle.

BRIEF DESCRIPTION OF DRAWINGS

FIGS. 5(*a*) to (*c*) shows movement information of each vehicle detected by the roadside apparatus;

FIGS. 6(a) to (c) shows the identification of the information-holding vehicle by using a matching degree of destinations;

FIGS. 10(a) and (b) shows the non-equipped vehicle information provided from the information-holding vehicle, and then received by a non-equipped-vehicle information receiving unit;

FIGS. 22(a) to (c) shows exemplary movement histories stored in the vehicle movement history storing unit as a node sequence;

FIG. 24(a) to (c) shows exemplary position information of the detected equipped and non-equipped vehicles;

NUMERICAL REFERENCES

Figure 1:
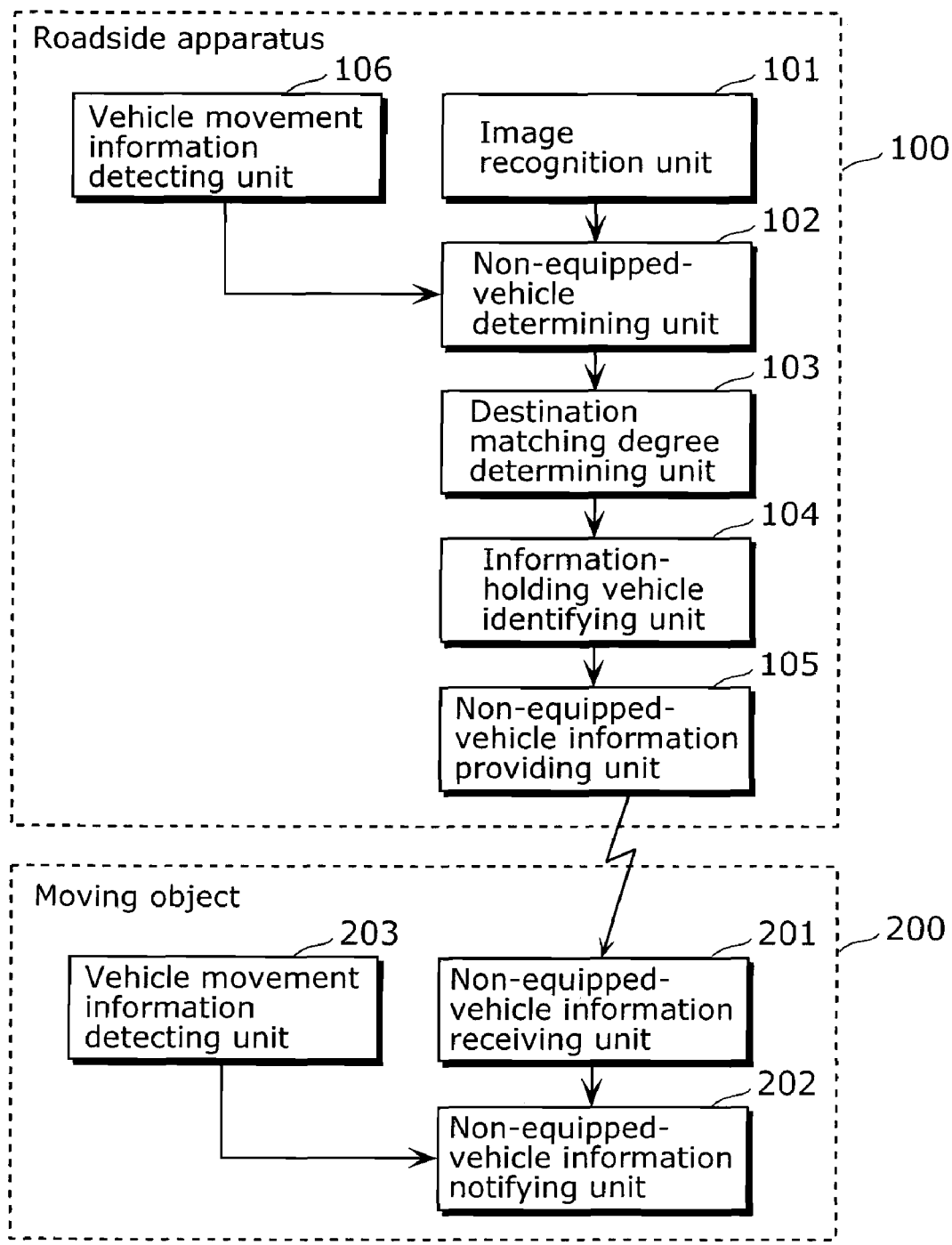
FIG. 1 is a block diagram showing a configuration of a travel support system according to a first embodiment of the present invention.

100 Roadside apparatus
101 Image recognition unit
102 Non-equipped-vehicle determining unit
103 Destination matching degree determining unit
104 Information-holding vehicle identifying unit
105 Non-equipped-vehicle information providing unit
106 Vehicle movement information detecting unit
107 Vehicle movement history storing unit
108 Destination predicting unit
109 Appearance information detecting unit
111 Non-equipped-vehicle detecting unit
112 Equipped-vehicle detecting unit
113 Information-holding vehicle identifying unit
115 Communicating unit
120 Camera
200 Equipped vehicle (moving object)
201 Non-equipped-vehicle information receiving unit
202 Non-equipped-vehicle information notifying unit
203 Vehicle movement information detecting unit
205 Communicating unit
350 Car navigation device
351 Speaker
352 Input unit
353 Display unit
354 External memory
355 GPS
356 ROM
357 CPU
358 RAM
359 Communicating unit
360 Bus
361 Imaging unit

DETAILED DESCRIPTION OF THE INVENTION

Hereinafter, a roadside apparatus according to the present invention is described with reference to the drawings.

First Embodiment

FIG. 1 is a block diagram showing a system configuration according to the first embodiment. Hereinafter, a description is given first for each constituent element, and then for operational flows according to the present invention.

First, a roadside apparatus 100 placed on an intersection or a road includes: an image recognition unit 101; a non-equipped-vehicle determining unit 102; a destination matching degree determining unit 103; an information-holding vehicle identifying unit 104; a non-equipped-vehicle information providing unit 105; and a vehicle movement information detecting unit 106. Generally, a roadside apparatus is provided at a predetermined intersection or roadside, as an intersection or traffic surveillance system (N system) and the like. Such a roadside apparatus has a function of transmitting and receiving information in communication networks or in the form of an image. A set of the image recognition unit 101, the non-equipped-vehicle determining unit 102, and the vehicle movement information detecting unit 106 shows one of the examples of an equipped-vehicle detecting unit which detects the presence and the position of a vehicle equipped with a communication module for communicating with another vehicle, and a non-equipped-vehicle detecting unit which detects the presence and the position of a vehicle that is not equipped with a communication module for communicating with another vehicle. The equipped-vehicle detecting unit further detects the moving direction of the equipped vehicle. Specifically, the non-equipped-vehicle detecting unit includes: the image recognition unit 101 which obtains moving images and extracts vehicle images from the obtained moving images by recognizing moving objects in the moving images; the vehicle movement information detecting unit 106 which detects the movement information of a vehicle by communicating with the communication module included in the vehicle and obtaining position information of the vehicle from the vehicle including the communication module; and the non-equipped-vehicle determining unit 102 which determines, as the non-equipped vehicle, a vehicle with which the vehicle movement information detecting unit cannot communicate, from among the vehicles of the vehicle images extracted by the image recognition unit. The image recognition unit 101 identifies the position of the vehicle from the coordinates of the extracted vehicles in the moving image. The non-equipped-vehicle determining unit 102 further excludes one of the vehicles included in the position information detected by the vehicle movement information detecting unit 106 from among the vehicles extracted by the image recognition unit 101, by checking the position of each vehicle identified by the image recognition unit 101 with the position information obtained by the vehicle movement information detecting unit 106. The non-equipped-vehicle determining unit 102 then determines a remaining one or more of the vehicles after the exclusion as the non-equipped vehicle. The roadside apparatus placed on an intersection or a road includes the image recognition unit 101, the non-equipped-vehicle determining unit 102, and the vehicle movement information detecting unit 106, as examples of the equipped-vehicle detecting unit and the non-equipped-vehicle detecting unit; the information-holding vehicle identifying unit 104 as an example of the information-holding vehicle identifying unit; and the non-equipped-vehicle information providing unit 105 as an example of the non-equipped-vehicle information providing unit.

Figure 2:
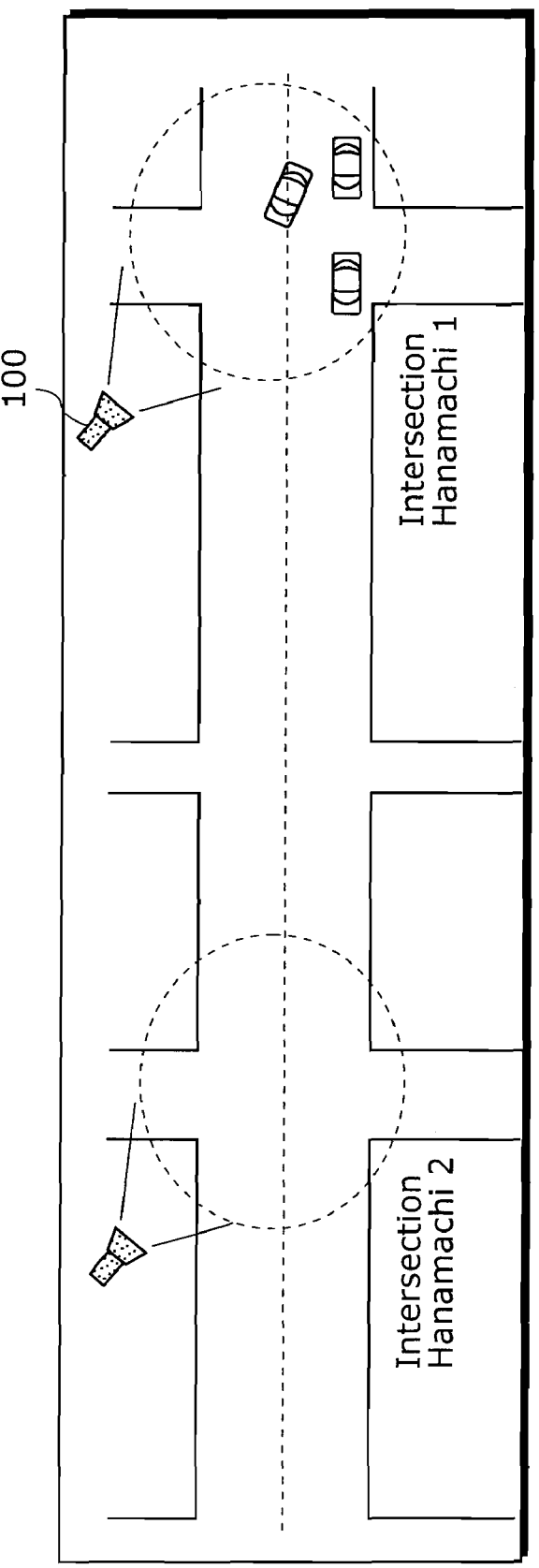
FIG. 2 shows an image of an intersection recognized by a roadside apparatus.

The image recognition unit 101 included in the roadside apparatus 100 recognizes an image of an intersection or a route, using a camera or the like. FIG. 2 shows an image of an intersection recognized by the roadside apparatus. In FIG. 2, the roadside apparatus 100 is placed at Intersection Hanamachi 1. The roadside apparatus 100 includes an intersection camera as the image recognition unit 101. The roadside apparatus 100 recognizes a predetermined range as an image, for example, a range of the intersection shown by a dotted circle.

Figure 3:
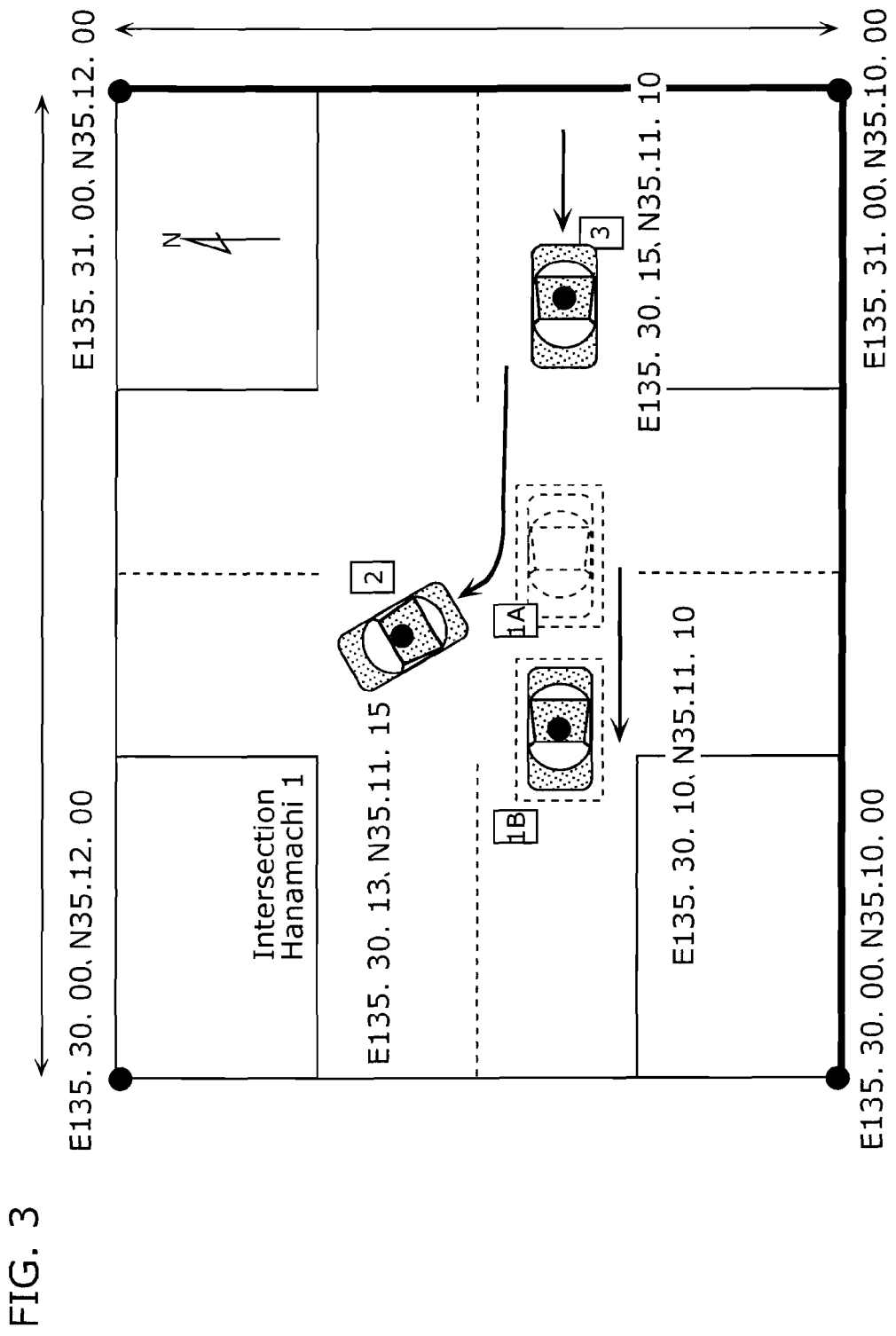
FIG. 3 shows an exemplary image of Intersection Hanamachi 1 recognized by an image recognition unit.

FIG. 3 shows an exemplary image of Intersection Hanamachi 1 recognized by the image recognition unit 101. In the first embodiment, first, the image recognition unit 101 extracts vehicle images from the moving images. The image recognition unit 101 can extract the moving images by obtaining a difference between the different image positions recognized in a predetermined sampling period. For example, in FIG. 3, a vehicle 1 is recognized at a position of 1A at a given point in time, and the vehicle 1 is then recognized at a position of 1B at the next point in time. The vehicle 1 can be extracted as a moving image. In FIG. 3, in addition to the vehicle 1, a vehicle 2 and a vehicle 3 are extracted as moving images based on the difference between the different image positions recognized similarly.

Figure 4:
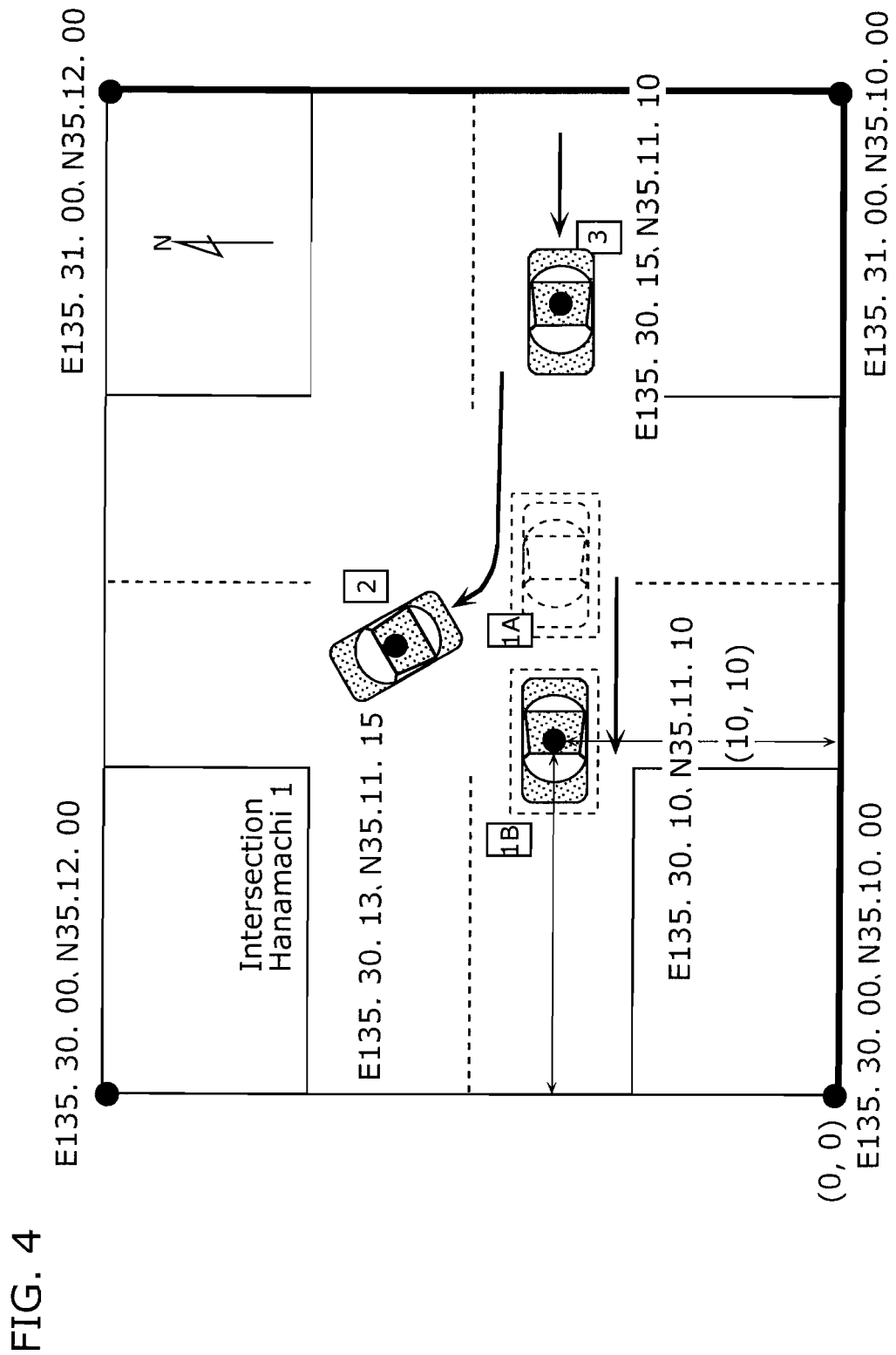
FIG. 4 shows an example in which the position of each moving object is calculated from pixels recognized with the bottom left corner of the figure as the origin point, the horizontal axis as the X coordinate, and the vertical axis as the Y coordinate.

In the first embodiment, the position information of each extracted moving image is also calculated. Since the roadside apparatus has a predetermined reference point such as the position where the roadside apparatus is placed, the position information of each recognized moving object can be calculated based on the reference point. FIG. 4 shows an example in which the position of each moving object is calculated from pixels recognized with the bottom left corner of the figure as the origin point, the horizontal axis as the X coordinate, and the vertical axis as the Y coordinate. In this example, the image to be recognized has coordinates of (E135.30.00, N35.10.00); (E135.30.00, N35.12.00); (E135.31.00, N35.12.00); and (E135.31.00, N35.10.00), at the four corners of the image. Based on these coordinates, the position of each moving object can be calculated. For example, as shown in FIG. 4, the position of each moving object is calculated from the recognized pixels with the bottom left corner of the figure as the origin point, the horizontal axis as the X coordinate, and the vertical axis as the Y coordinate. In this example, based on the bottom left coordinates (0, 0) corresponding to the coordinates (E135.30.00, N35.10.00), the coordinates of the vehicle 1 is calculated as (10, 10) and the position of the vehicle 1 as (E135.30.10, N35.11.10). Similarly, the position of each vehicle is calculated. For example, the position of the vehicle 2 is at the coordinates (E135.30.13, N35.11.15), and the position of the vehicle 3 is at the coordinates (E135.30.15, N35.11.10). Furthermore, based on a sampling period to be detected and a difference between different image positions, the speed and the moving direction of each moving object can be calculated. In this example, the vehicle 1 has coordinates of (E135.30.11, N35.11.10) at the position of 1A, and then has the coordinates of (E135.30.10, N35.11.10) at the position of 1B after 0.5 second. Since the distance between 1A and 1B is equal to one second east longitude, the roadside apparatus calculates that the vehicle 1 travels approximately at a speed of 50 km an hour in the west direction. Note that this calculation is performed by roughly converting one second east longitude to 25 m. Similarly, for example, the roadside apparatus calculates that the vehicle 2 travels at a speed of 40 km an hour in the north direction, and the vehicle 3 at a speed of 50 km an hour in the west direction.

The vehicle movement information detecting unit 106 detects the position information of each vehicle. In recent years, vehicles include a unit which detects their own current position by a GPS such as a car navigation system. Furthermore, in vehicle-to-vehicle communication, the vehicles transmit the detected position information therebetween, so as to avoid occurrence of a head-on collision, and to merge with other traffic safely. In addition to the vehicle-to-vehicle communication, each vehicle transmits its movement information and the like to a roadside apparatus placed on an intersection or along a route so that the server of the roadside apparatus can use the movement information as information regarding traffic congestion. Also in the first embodiment, the roadside apparatus detects the movement information of each vehicle.

FIGS. 5(a)-(c) show the movement information of each vehicle detected by the roadside apparatus 100. FIG. 5(a) shows an example of the position information of equipped vehicles detected by the roadside apparatus in communication networks. For example, the movement information detected from the vehicle 1 includes "001" as a vehicle ID; (E135.30.10, N35.11.10) as position information; "west" as a moving direction; and "50 km/h" as a speed. Similarly, the movement information detected from the vehicle 2 includes "002" as a vehicle ID; (E135.30.13, N35.11.10) as position information; "north" as a moving direction; and "40 km/h" as a speed.

FIG. 5(b) shows exemplary position information of each vehicle detected by the roadside apparatus 100 by image recognition. On the other hand, since vehicle-to-vehicle communication and communication with the roadside apparatus are established through a module, it is impossible to communicate with a vehicle having no communication module (non-equipped vehicle). Therefore, for example, even when a given vehicle has a system for making a notification to avoid occurrence of a head-on collision with another vehicle recognized in vehicle-to-vehicle communication, the system-equipped vehicle cannot recognize a vehicle in the case where the vehicle is a non-equipped vehicle. This increases the collision risk with a non-equipped vehicle. Accordingly, it is an object of the first embodiment to avoid such a collision risk by identifying a non-equipped vehicle so that an equipped vehicle holds the non-equipped vehicle information.

The non-equipped-vehicle determining unit 102 determines whether or not a given vehicle is a non-equipped vehicle having no communication module, from images recognized by the image recognition unit 101, and from the position information of each vehicle detected by the vehicle movement information detecting unit 106.

FIGS. 5(a)-(c) illustrate the determination to be made whether or not a given vehicle is a non-equipped vehicle. As stated above, the vehicle movement information detecting unit 106 has detected the movement information of each vehicle. At the same time, as shown in FIG. 2, the image recognition unit 101 has recognized each moving object, the position, the moving speed, and the moving direction of the moving object. Based on the information, the non-equipped-vehicle determining unit 102 determines that a given vehicle is a non-equipped vehicle. For example, the position (E135.30.10, N35.11.10), the moving direction "west", and the speed "50 km/h" included in the movement information of the vehicle 1 detected by the vehicle movement information detecting unit 106 (see FIG. 5(a)) match the recognition ID "101", the position (E135.30.10, N35.11.10), the moving direction "west", and the speed "50 km/h" included in the information of one of the moving objects recognized by the image recognition unit 101 (see FIG. 5(b)). Therefore, the vehicle having the recognition ID "101" can be identified as the vehicle 1. Similarly, the position (E135.30.13, N35.11.10), the moving direction "north", and the speed "40 km/h" included in the movement information of the vehicle 2 (see FIG. 5(a)) match the recognition ID "102", the position (E135.30.13, N35.11.10), the moving direction "north", and the speed "40 km/h" included in the information of one of the moving objects recognized by the image recognition unit 101 (see FIG. 5(b)). Therefore, the vehicle having the recognition ID "102" can be identified as the vehicle 2. FIG. 5(c) shows exemplary position information of the vehicle identified as a non-equipped vehicle. The information of the vehicle recognized as the vehicle having the recognition ID "103" shown in FIG. 5(b) is not detected by the vehicle movement information detecting unit 106. Therefore, the vehicle is identified as a non-equipped vehicle equipped with no communication module (see FIG. 5(c)). In the first embodiment, each vehicle is identified when matching is found in terms of position and speed. However, a positional or speed error may appear in image recognition, and the position detected by a GPS or the like may also have an error. Therefore, each vehicle can be identified by applying a predetermined threshold level to the vehicle, not limited to matching. Furthermore, a conventional technique of associating the moving object obtained by image-recognition with the position information detected by another means is known, and the description thereof is omitted here.

The information-holding vehicle identifying unit 104 is an exemplary information-holding vehicle identifying unit which identifies an information-holding vehicle from the equipped vehicles detected by the equipped-vehicle detecting unit, based on the positions of the equipped vehicles detected by the equipped-vehicle detecting unit and the position of the non-equipped vehicle detected by the non-equipped-vehicle detecting unit. The information-holding vehicle is an equipped vehicle for holding the non-equipped vehicle information including the information regarding the position of the non-equipped vehicle. The information-holding vehicle identifying unit 104 identifies the vehicle for holding the information regarding the non-equipped vehicle determined by the non-equipped-vehicle determining unit 102 (hereinafter, referred to as an "information-holding vehicle). The destination matching degree determining unit 103 is an exemplary destination matching degree determining unit which determines the matching degree of destinations between each equipped vehicle and a non-equipped vehicle, based on the position of the equipped vehicle detected by the equipped-vehicle detecting unit and the position of the non-equipped vehicle detected by the non-equipped-vehicle detecting unit. On the other hand, the information-holding vehicle identifying unit identifies the equipped vehicle which is determined by the destination matching degree determining unit to have a high matching degree of destinations with the non-equipped vehicle, as the information-holding vehicle. The destination matching degree determining unit determines that the equipped vehicle and the non-equipped vehicle match each other at a high degree in terms of destination in the case where the moving direction of the equipped vehicle detected by the equipped-vehicle detecting unit matches with the moving direction of the non-equipped vehicle detected by the non-equipped-vehicle detecting unit. Furthermore, the destination matching degree determining unit determines the matching degree between the destinations of the equipped vehicle and the non-equipped vehicle predicted by the destination predicting unit. In the first embodiment, for example, the destination matching degree determining unit 103 determines a matching degree of movement between the non-equipped vehicle and each equipped vehicle, based on the movement information recognized by the image recognition unit 101. The destination matching degree determining unit 103 then identifies the vehicle for holding the non-equipped vehicle information, based on the determined matching degree of destinations.

FIGS. 6(a)-(c) show the identification of the information-holding vehicle by using the matching degree of destinations. FIG. 6(a) shows exemplary position information of equipped vehicles. In this case, as described above, the positions, the moving directions, and the speeds of the vehicle 1 and the vehicle 2 have been identified. FIG. 6(b) shows exemplary position information of the vehicle identified as a non-equipped vehicle. At the same time, the position, the moving direction, and the speed of the vehicle identified as a non-equipped vehicle (hereinafter, referred to as a vehicle 3) have also been recognized. The destination matching degree determining unit 103 then determines the matching degree of destinations between the non-equipped vehicle and each vehicle. Referring to FIGS. 6(a)-(c), the moving direction "west" and the speed "50 km/h" of the non-equipped vehicle are different from the moving direction "north" and the speed "40 km/h" of the vehicle 2. In the case where the vehicle 2 tries to hold the information of the vehicle 3 as a non-equipped vehicle in this case, the vehicles are parted from each other due to their different moving directions. Therefore, the vehicle 2 is not suitable as the information-holding vehicle. On the other hand, the vehicle 1 has a matching moving direction of "west" and a matching speed "50 km/h" with those of the vehicle 3. The movements of the vehicles are similar to each other. Therefore, in this example, the vehicle 1 is identified as the information-holding vehicle.

Figure 7:
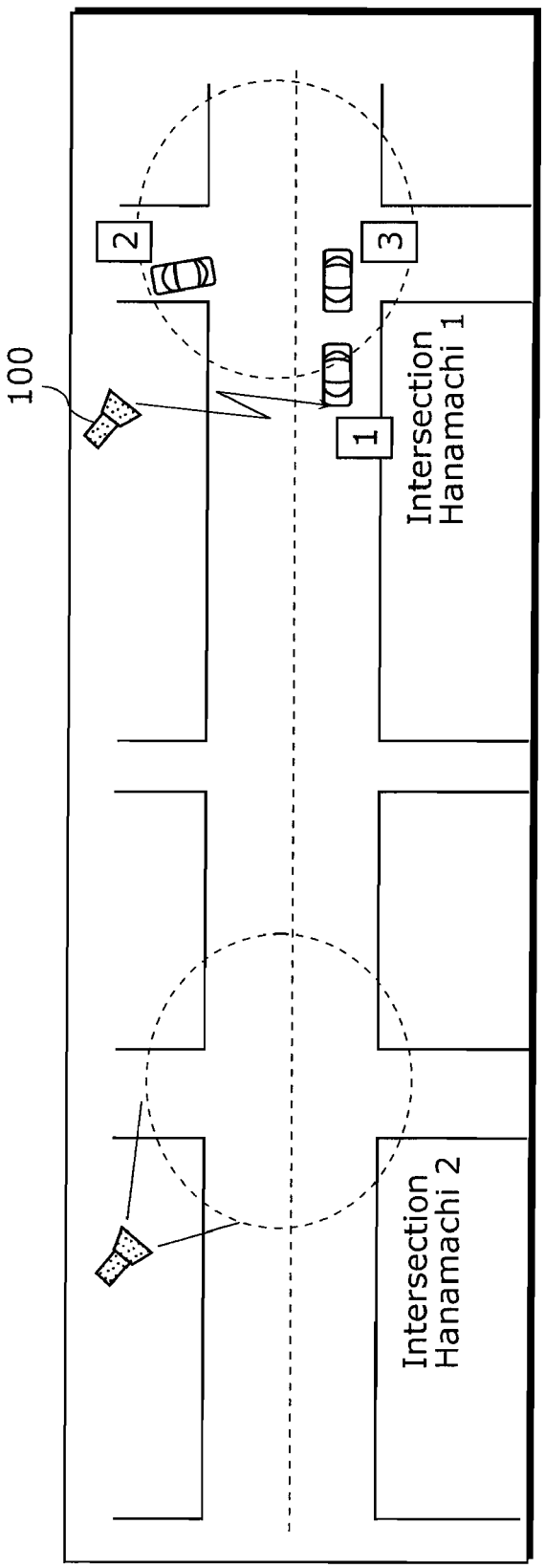
FIG. 7 shows the provision of the non-equipped vehicle information.

The non-equipped-vehicle information providing unit 105 is an exemplary non-equipped-vehicle information providing unit which provides the non-equipped vehicle information to the information-holding vehicle identified by the information-holding vehicle identifying unit. In the first embodiment, the non-equipped-vehicle information providing unit 105 provides the non-equipped vehicle information to the vehicle identified as an equipped vehicle. FIG. 7 shows the provision of the non-equipped vehicle information. In this case, the non-equipped vehicle information regarding the vehicle 3 is provided to the vehicle 1 identified as the information-holding vehicle by the roadside apparatus 100. The non-equipped vehicle information includes, for example, the position of the non-equipped vehicle relative to the information-holding vehicle, and the moving speed thereof. FIG. 6(c) shows exemplary non-equipped vehicle information as the information regarding the non-equipped vehicle. For example, the relative position "125 meters backward (=east longitude 5 seconds× 25 m)" and the speed "50 km/h" are displayed as the non-equipped vehicle information based on the difference between the detected positions. The non-equipped-vehicle information providing unit 105 thus provides the information regarding the vehicle 3 identified as the non-equipped vehicle, to the vehicle 1 as the information-holding vehicle.

Referring to FIG. 1, an equipped vehicle (moving object) 200 has been identified as the information-holding vehicle. The equipped vehicle 200 includes: a non-equipped-vehicle information receiving unit 201; a vehicle movement information detecting unit 203; and a non-equipped-vehicle information notifying unit 202. The equipped vehicle 200 makes a notification about the non-equipped vehicle information.

The non-equipped-vehicle information receiving unit 201 is an exemplary communication unit included in the information-holding vehicle. The non-equipped-vehicle information receiving unit 201 holds the non-equipped vehicle information provided by the non-equipped-vehicle information providing unit, as well as provides the holding non-equipped vehicle information to another equipped vehicle through the communication module thereof. In the first embodiment, the non-equipped-vehicle information receiving unit 201 receives the non-equipped vehicle information. The vehicle movement information detecting unit 203, as the aforementioned vehicle movement information detecting unit 106, is a vehicle-to-vehicle module employed for communicating about the position information detected by the GPS or the like included in each vehicle, so as to avoid occurrence of a head-on collision. The non-equipped-vehicle information notifying unit 202 makes a notification about the received non-equipped vehicle information, based on the position of the other vehicle detected by the vehicle movement information detecting unit 203. Hereinafter, a description is given with reference to the drawings.

Figure 8:
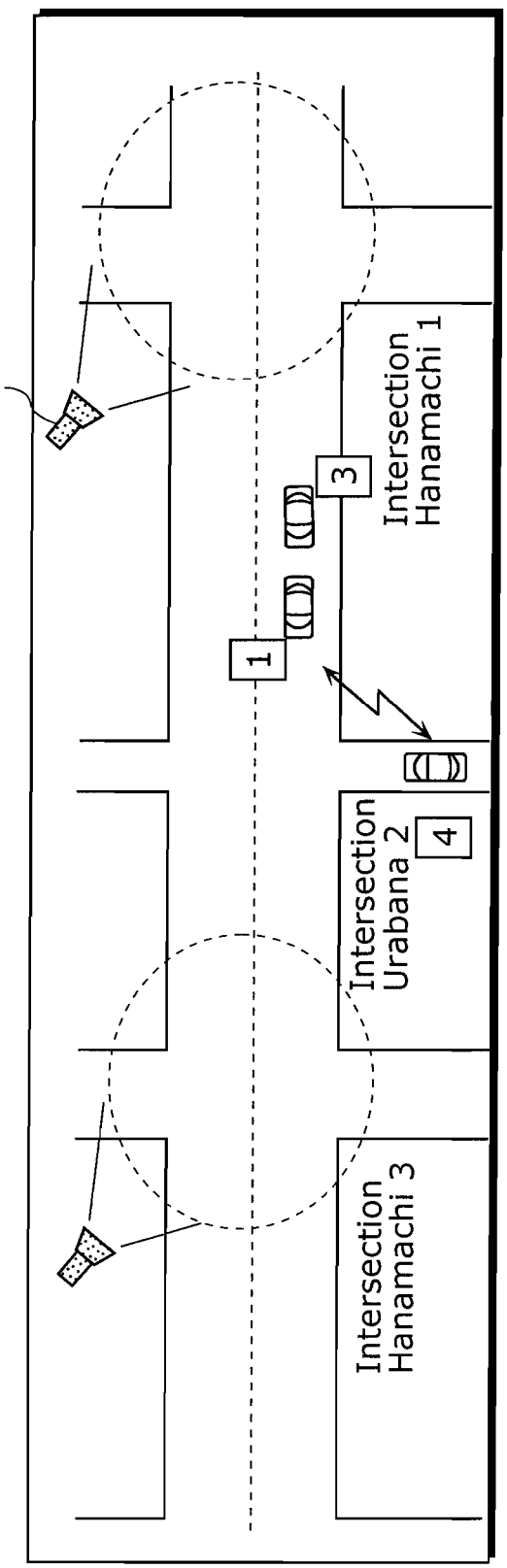
FIG. 8 illustrates a notification of non-equipped vehicle information.

FIG. 8 illustrates a notification of non-equipped vehicle information. The vehicle 1 is traveling through Intersection Hanamachi 1 to the west. At the same time, a vehicle 4 is traveling through Intersection Urabana 2 to the north. In this case, Intersection Urabana 2 is so blind that the vehicles cannot know that the vehicles are approaching each other. In response to such a situation, there is known a conventional technique of notifying each other's position through vehicle-to-vehicle communication so as to avoid occurrence of a head-on collision. Also in the first embodiment, the vehicle movement information detecting unit 203, as a communication module which allows this vehicle-to-vehicle communication, communicates about each other's position information, so as to avoid occurrence of a head-on collision.

Figure 9:
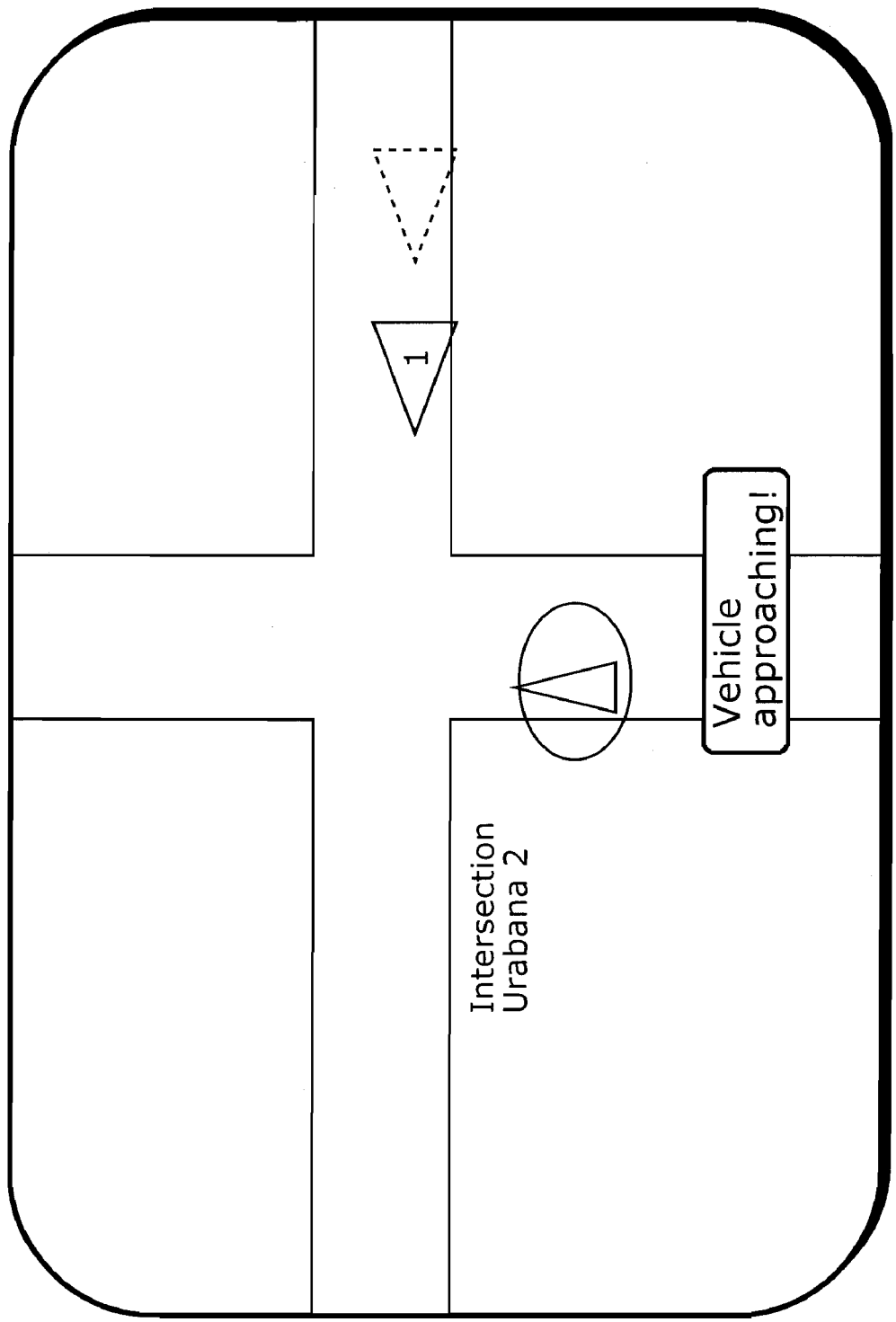
FIG. 9 shows an exemplary screen of a car navigation system included in a vehicle 4.

However, such a system is available only between vehicles each having a vehicle-to-vehicle communication module. Therefore, a non-equipped vehicle having no vehicle-to-vehicle communication module cannot be recognized. This increases the risk of a collision with the non-equipped vehicle. FIG. 9 shows an exemplary screen of the car navigation system included in the vehicle 4. In this case, the vehicle 4, which is positioned close to Intersection Urabana 2, is notified that a vehicle is approaching, based on the movement information of the vehicle 1 detected by the vehicle movement information detecting unit 203. This allows the user of the vehicle 4 to know that the vehicle 1 is approaching. However, the user cannot recognize the vehicle 3, which is a non-equipped vehicle positioned in the rear of the vehicle'. The user may misguidedly think that only the vehicle 1 is approaching. This misguided idea causes the vehicle 4 to run off after the vehicle 1 passes through. As a result, the vehicle 4 may have a collision with the vehicle 3. Accordingly, in the first embodiment, the non-equipped-vehicle information notifying unit 202 notifies the non-equipped vehicle information to avoid such a collision.

FIGS. 10(a) and (b) show the non-equipped vehicle information which is provided from the vehicle 1 that is the information-holding vehicle and is received by the non-equipped-vehicle information receiving unit 201. In addition to the information of the vehicle 1 shown in FIG. 10(a) including the vehicle ID "001", the position (E135.30.05, N35.11.10), the moving direction "west", and the speed "50 km/h", the equipped vehicle 4 receives non-equipped vehicle information as shown in FIG. 10(b). The non-equipped vehicle information includes the recognition ID "103", the relative position "125 meters backward", and the speed "50 km/h". The non-equipped-vehicle information notifying unit 202 notifies the non-equipped vehicle information thus obtained.

Figure 11:
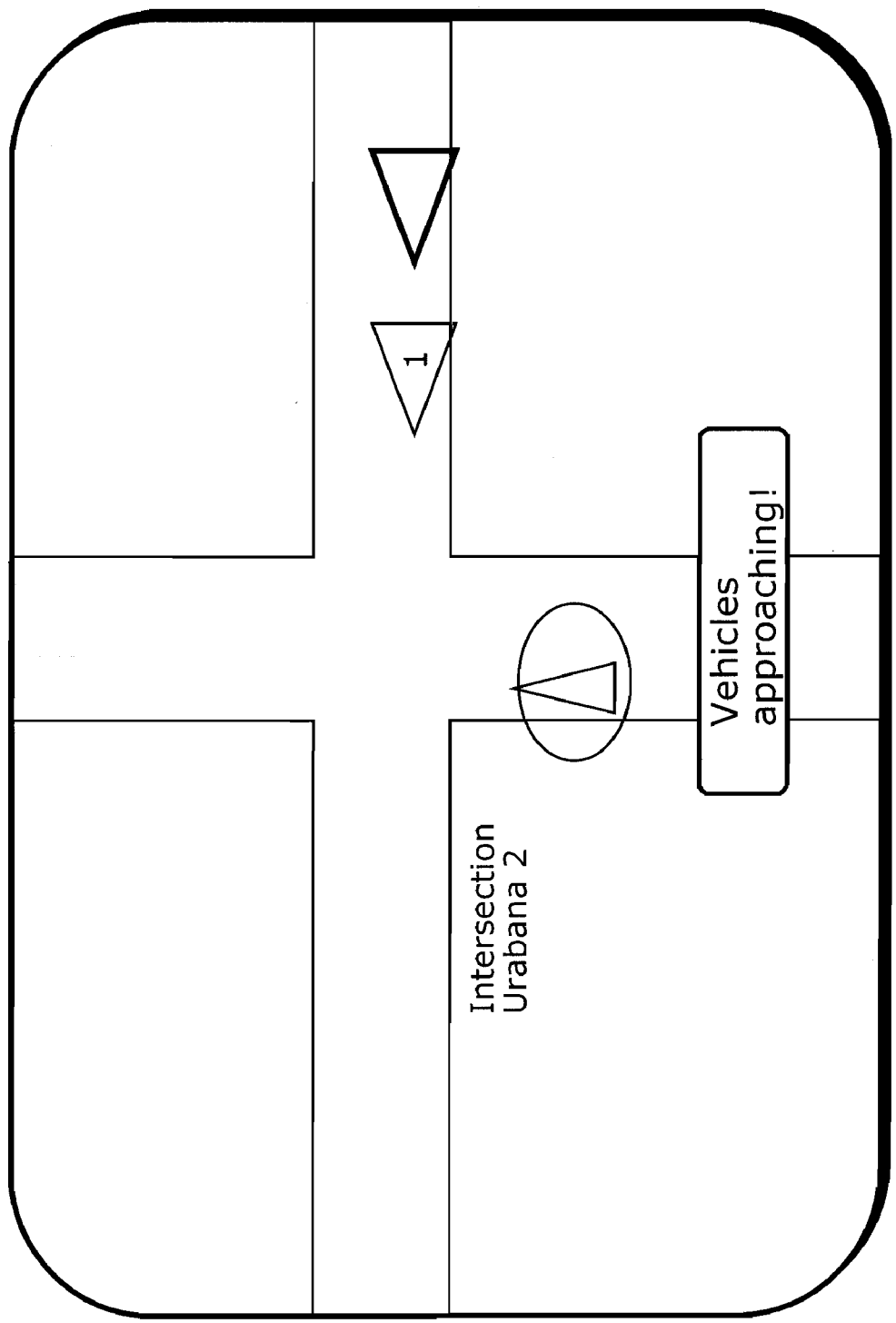
FIG. 11 shows an exemplary notification of non-equipped vehicle information.

FIG. 11 shows an exemplary notification of non-equipped vehicle information. FIG. 11 is different from FIG. 9 in that the notification is made that non-equipped vehicles are approaching 250 meters backward, in addition to the information that the vehicle 1 is approaching. By notifying the non-equipped vehicle information in this way, the user can know not only that a vehicle is approaching, but also that a non-equipped vehicle is present around the equipped vehicle. This allows safety traveling of a vehicle.

In recent years, vehicles with a camera have been available. Detecting the presence of a non-equipped vehicle around each equipped vehicle by using the vehicle-mounted camera so as to notify the presence of the non-equipped vehicle is technically possible. However, such a camera-mounted vehicle is not always present. Furthermore, even when a camera is mounted inside a vehicle, vehicle-mounted cameras vary in terms of detection range, precision, and the like. In some cases, only the use of vehicle-mounted cameras is insufficient for avoiding a collision.

On the other hand, as described in the first embodiment, using the image recognition unit 101 or the like placed in a predetermined area such as an intersection or a roadside, like the N system, a non-equipped vehicle can be detected with a high degree of precision. Furthermore, a collision can be avoided over a wide range, regardless of the presence or absence of any camera-mounted vehicle.

Figure 12:
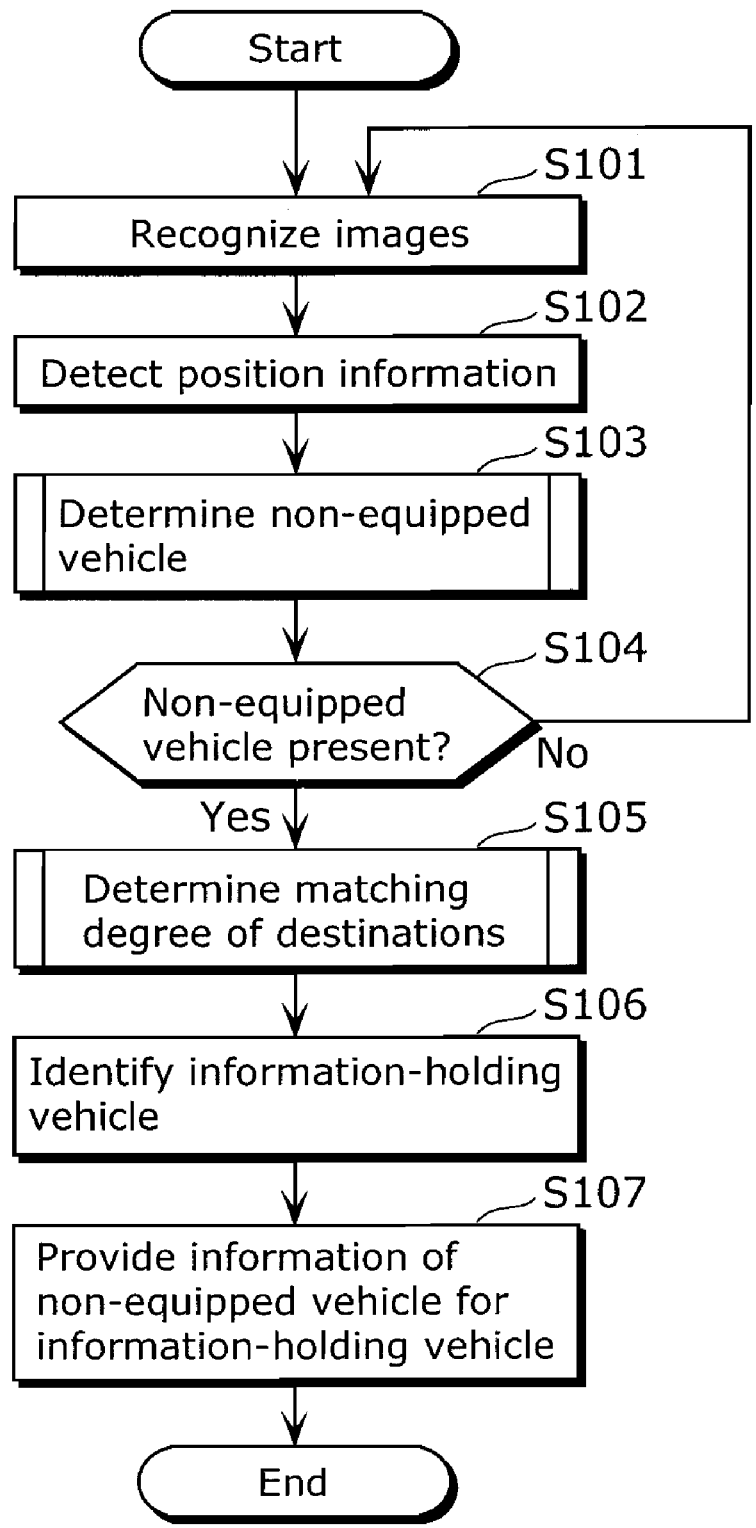
FIG. 12 is a flow chart showing an exemplary operation of the entire travel support system according to the first embodiment.
Figure 13:
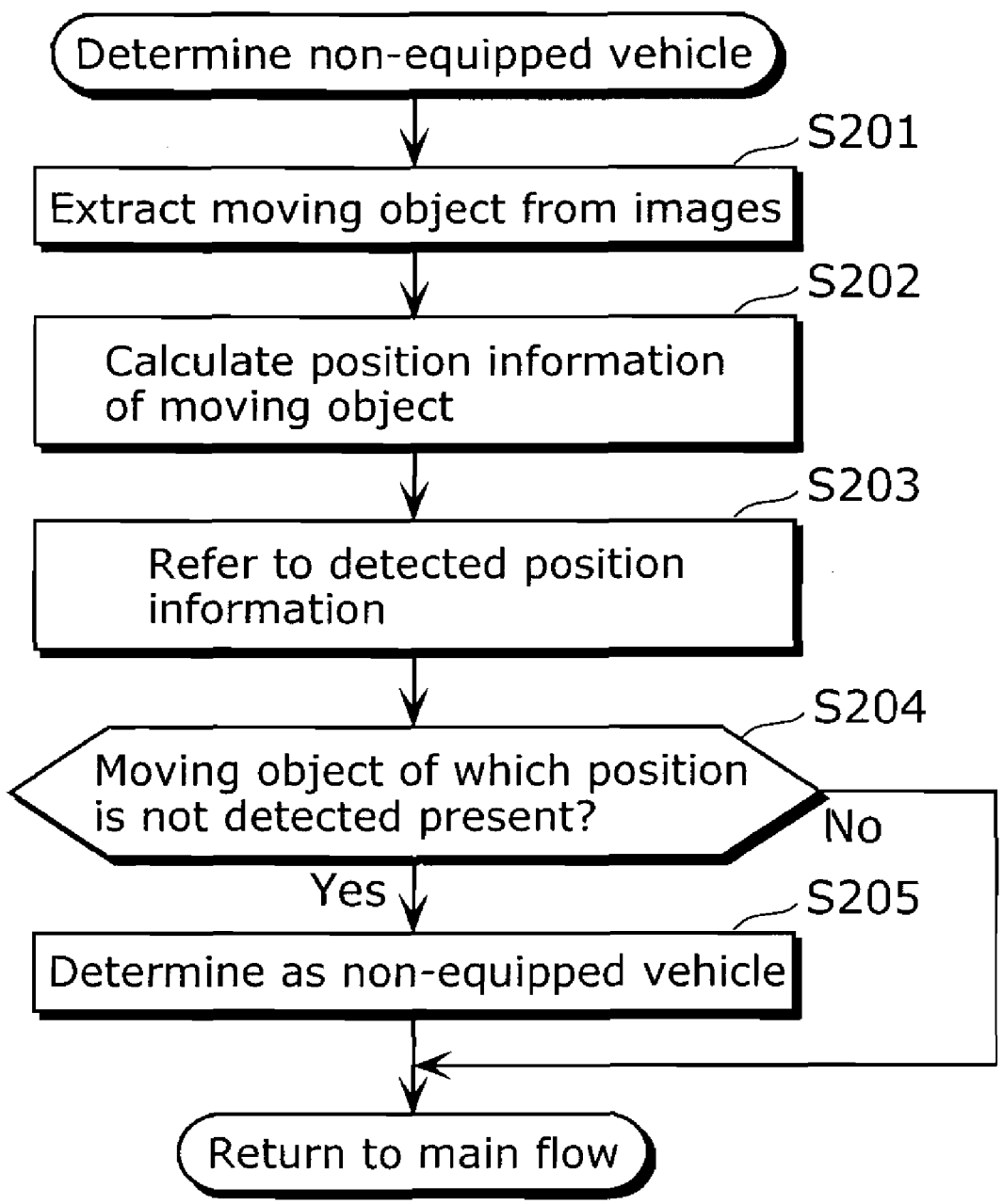
FIG. 13 is a flow chart showing an exemplary non-equipped vehicle determination operation to be made by the non-equipped-vehicle determining unit 102 in Step 103 of FIG. 12.
Figure 14:
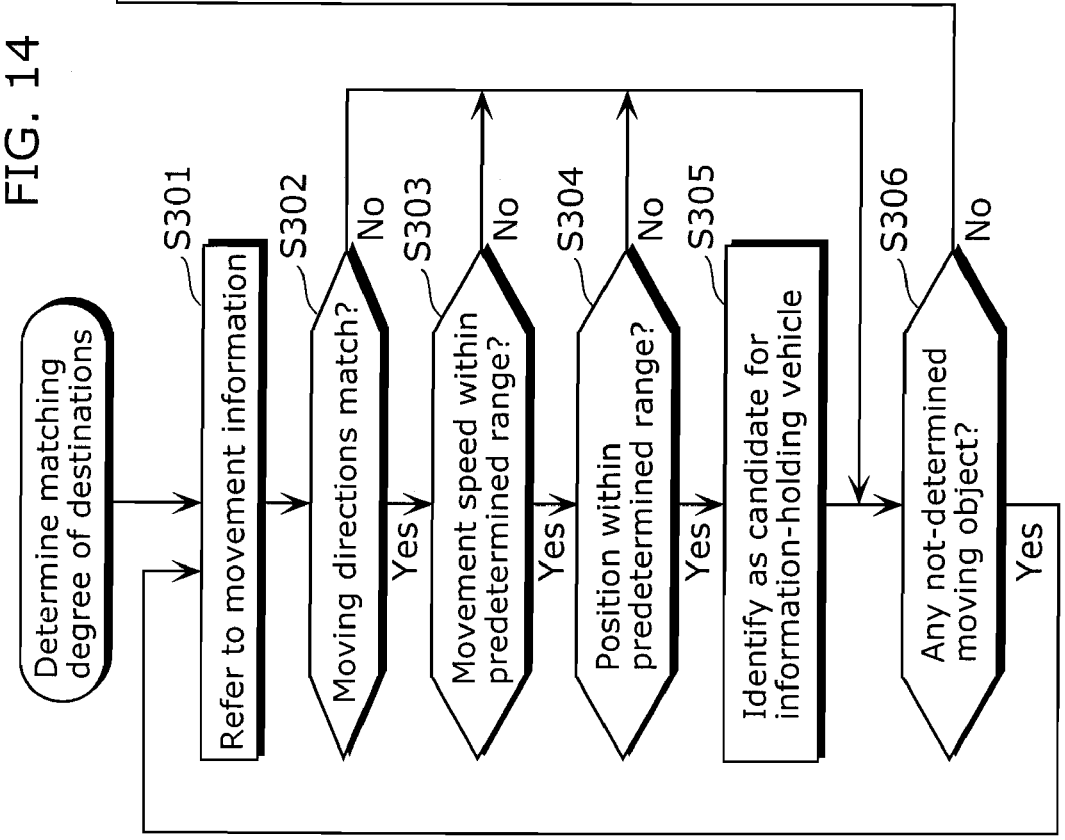
FIG. 14 is a flow chart showing an exemplary operation of the destination matching degree determining unit 103 in Step 105 of FIG. 12.
Figure 15:
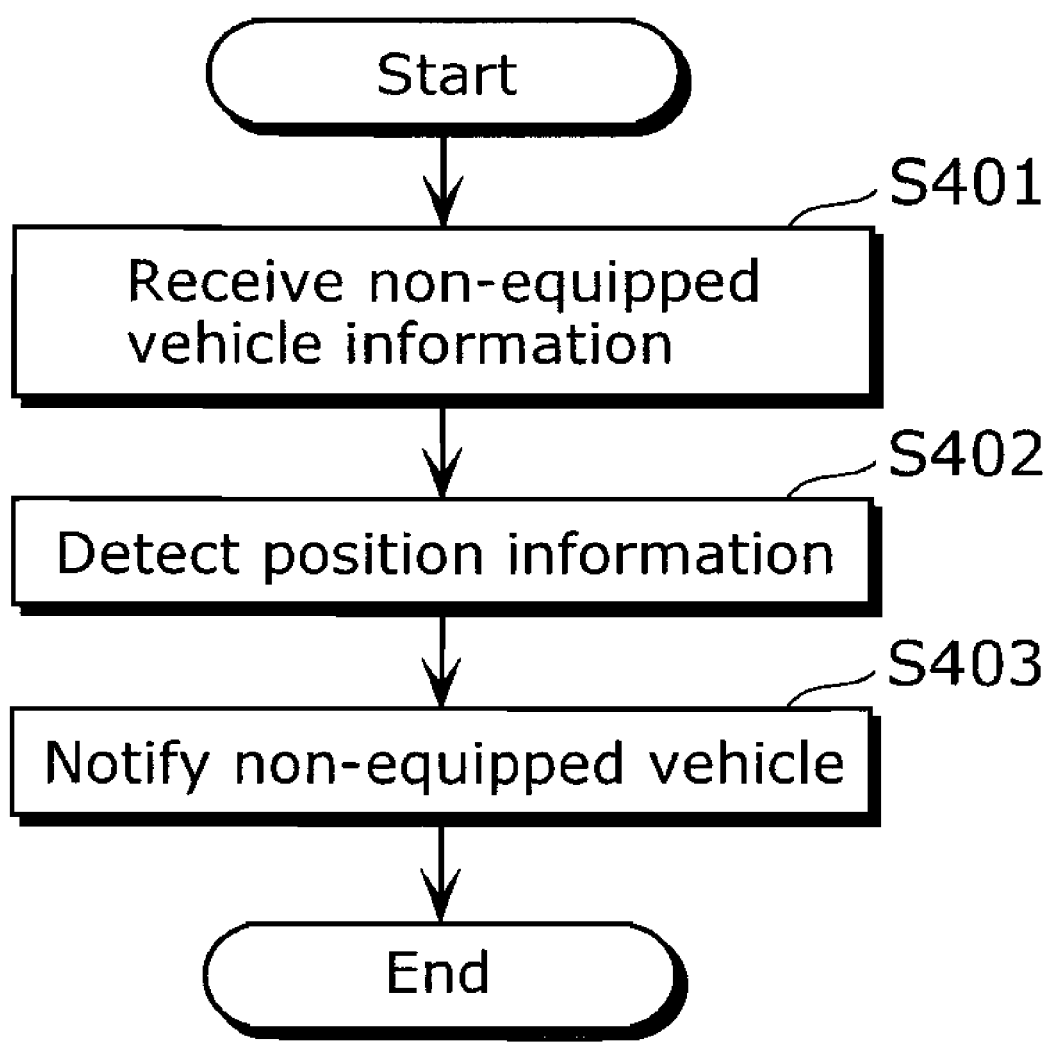
FIG. 15 is a flow chart showing an exemplary operation of the equipped vehicle to be performed when the equipped vehicle receives the information regarding the non-equipped vehicle whose destination matches the destination of the equipped vehicle, from a non-equipped-vehicle information providing unit.

Hereinafter, operations according to the present invention are described with reference to the flow charts of FIG. 12, FIG. 13, FIG. 14, and FIG. 15. FIG. 12 is a flow chart showing an exemplary operation of the entire travel support system according to the first embodiment. FIG. 13 is a flow chart showing an exemplary non-equipped vehicle determination operation to be made by the non-equipped-vehicle determining unit 102 in Step 103 of FIG. 12. FIG. 14 is a flow chart showing an exemplary operation of the destination matching degree determining unit 103 in Step 105 of FIG. 12. FIG. 15 is a flow chart showing an exemplary operation of the equipped vehicle 200 to be performed when the equipped vehicle 200 receives the information regarding the non-equipped vehicle whose destination matches the destination of the equipped vehicle 200, from the non-equipped-vehicle information providing unit 105.

First, the image recognition unit 101 recognizes images (Step S101). On the other hand, the vehicle movement information detecting unit 106 communicates with the communication module included in each equipped vehicle, to detect the position information of the vehicle, from the vehicle including the communication module (Step S102). Based on the image information and the position information, the non-equipped-vehicle determining unit 102 determines a non-equipped vehicle (Step S103).

In order to determine a non-equipped vehicle, as shown in FIG. 13, first, vehicle images are extracted from the image information (Step S201). The position information of the extracted vehicle images is calculated (Step S202). On the other hand, the position information detected by the vehicle movement information detecting unit 106 is referred to (Step S203). A determination is made whether or not any moving object of which position has not been detected is present, specifically, whether or not any non-equipped vehicle is present (Step S204). When no such moving object is present (Step S204: No), this means that no non-equipped vehicle is present. The operation returns to the main flow. On the other hand, when any such moving object is present (Step S204: Yes), the moving object is determined as a non-equipped vehicle (Step S205). The operation then returns to the main flow.

When any non-equipped vehicle is present (Step S104: Yes), the operation moves on to Step S105. When no non-equipped vehicle is present (Step S104: No), the operation returns to Step S101 to repeat the steps of vehicle detection to non-equipped vehicle determination (Step S101 to Step S104).

When any non-equipped vehicle is present (Step S104: Yes), the destination matching degree determining unit 103 determines the matching degree of destinations between the non-equipped vehicle and the equipped vehicle.

In order to determine the matching degree of destinations, as shown in FIG. 14, first, the movement information of one of the vehicles recognized in the image information is referred to (Step S301). The moving directions of the non-equipped vehicle and the equipped vehicle are compared to determine whether or not the moving directions match each other (Step S302). When the moving directions match (Step S302: Yes), the operation moves on to Step S303. When the moving directions do not match, the operation moves on to Step S306. When the moving directions match (Step S302: Yes), next, a determination is made whether or not the moving speed of the equipped vehicle is within a predetermined range (Step S303). When the moving speed is within the predetermined range (Step S303: Yes), the operation moves on to Step S304. When the moving speed is beyond the range, the operation moves on to Step S306. When the moving speed is within the range (Step S303: Yes), a determination is made whether or not the position of the equipped vehicle is within a predetermined range (Step S304). When the position is within the predetermined range (Step S304: Yes), the operation moves on to Step S305. When beyond the range, the operation moves on to Step S306. When the moving direction, the speed, and the position of the equipped vehicle meet the above conditions, the equipped vehicle is identified as a candidate for the information-holding vehicle (Step S305).

Next, a determination is made whether or not any other vehicle which has not been determined yet is left (Step S306). When any undetermined vehicle is left (Step S306: Yes), the operation returns to Step S301 to determine the undetermined vehicle. On the other hand, when the matching degree of destinations has been determined between the non-equipped vehicle and all the equipped vehicles (Step S306: No), one of the equipped vehicles, of which position is the closest to the position of the non-equipped vehicle among the candidates for the information-holding vehicle, is identified as the information-holding vehicle (Step S307). The operation then returns to the main flow.

The information-holding vehicle identifying unit 104 identifies the vehicle identified in the above flow, as an information-holding vehicle (Step S106). The non-equipped vehicle information is provided to the information-holding vehicle (Step S107).

Referring to FIG. 15, the non-equipped-vehicle information receiving unit 201 in the equipped vehicle 200 which has been identified as the information-holding vehicle receives the non-equipped vehicle information as shown in FIG. 1 (Step S401). The vehicle movement information detecting unit 203 detects position information of another equipped vehicle in vehicle-to-vehicle communication (Step S402). The non-equipped-vehicle information notifying unit 202 notifies the non-equipped vehicle information to the user (Step S403).

(Minimum Configuration)

Figure 16:
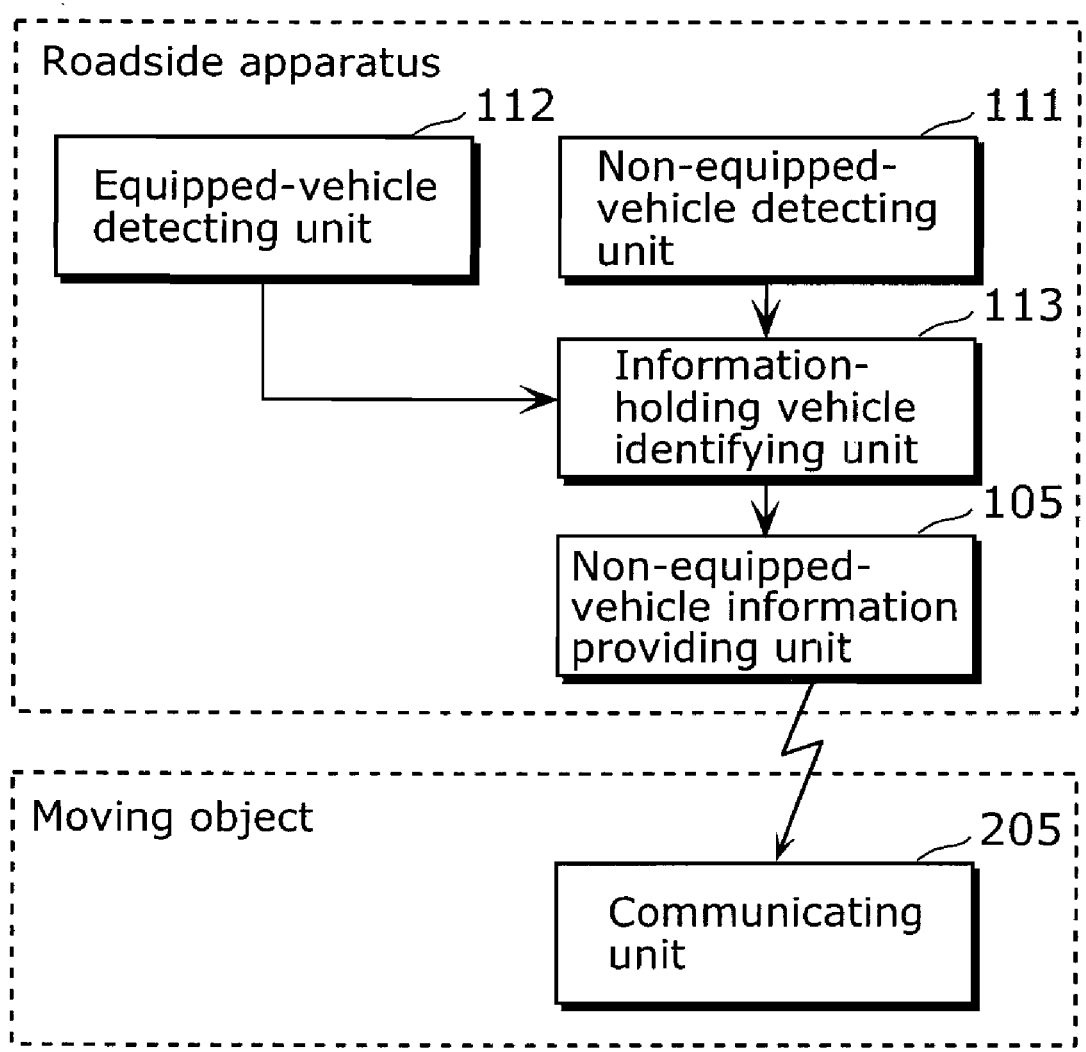
FIG. 16 shows an exemplary minimum configuration of the travel support system according to the first embodiment.

FIG. 16 shows an exemplary minimum configuration of the travel support system according to the first embodiment. In the first embodiment, a non-equipped vehicle is detected based on the images recognized by the image recognition unit 101 and the vehicle position information detected by the vehicle movement information detecting unit 106. However, the first embodiment is not limited to such a case. For example, a non-equipped vehicle can be detected by detecting moving objects using a sensor such as a millimeter-wave sensor as a speed detector. Therefore, the system according to the first embodiment can be achieved by the system constituent elements shown in FIG. 16. Specifically, in a travel support system which supports traveling of a vehicle through communication between vehicles, a non-equipped-vehicle detecting unit 111 is an exemplary non-equipped-vehicle detecting unit which detects the presence and the position of a non-equipped vehicle equipped with no communication module for communicating with another vehicle. In the first embodiment, the non-equipped-vehicle detecting unit 111 detects a non-equipped vehicle equipped with no communication module for communication. The non-equipped-vehicle detecting unit further detects the moving direction of the non-equipped vehicle. An equipped-vehicle detecting unit 112 is an exemplary equipped-vehicle detecting unit which detects the presence and the position of an equipped vehicle equipped with a communication module for communicating with another vehicle. In the first embodiment, the equipped-vehicle detecting unit 112 detects an equipped vehicle equipped with the communication module for the communication. An information-holding vehicle identifying unit 113 identifies a vehicle for holding the information of the non-equipped vehicle, from among equipped vehicles, based on the position of the non-equipped vehicle and the position of the equipped vehicle. A non-equipped-vehicle information providing unit 105 provides the information of the non-equipped vehicle to the vehicle identified by the information-holding vehicle identifying unit 113. A communicating unit 115 provides the information of the non-equipped vehicle, held by the information-holding vehicle, to another equipped vehicle equipped with the communication module, in communication networks.

In the first embodiment, the image recognition unit 101 shown in FIG. 1 corresponds to the non-equipped-vehicle detecting unit 111 included in the roadside apparatus. Similarly, the vehicle movement information detecting unit 106 corresponds to the equipped-vehicle detecting unit 112. A set of the destination matching degree determining unit 103 and the information-holding vehicle identifying unit 104 corresponds to the information-holding vehicle identifying unit 113. A set of the non-equipped-vehicle information receiving unit 201, the vehicle movement information detecting unit 203, and the non-equipped-vehicle information notifying unit 202, included in each equipped vehicle, corresponds to a communicating unit 205. The communicating unit 205 shown in FIG. 16 is an exemplary communication unit included in the information-holding vehicle. The communicating unit 205 holds the non-equipped vehicle information provided by the non-equipped-vehicle information providing unit. The communicating unit 205 also provides the holding non-equipped vehicle information to another equipped vehicle through the communication module.

(Providing information to a vehicle traveling in the same driving lane and having its turn signal indicating the same direction)

Figure 17:
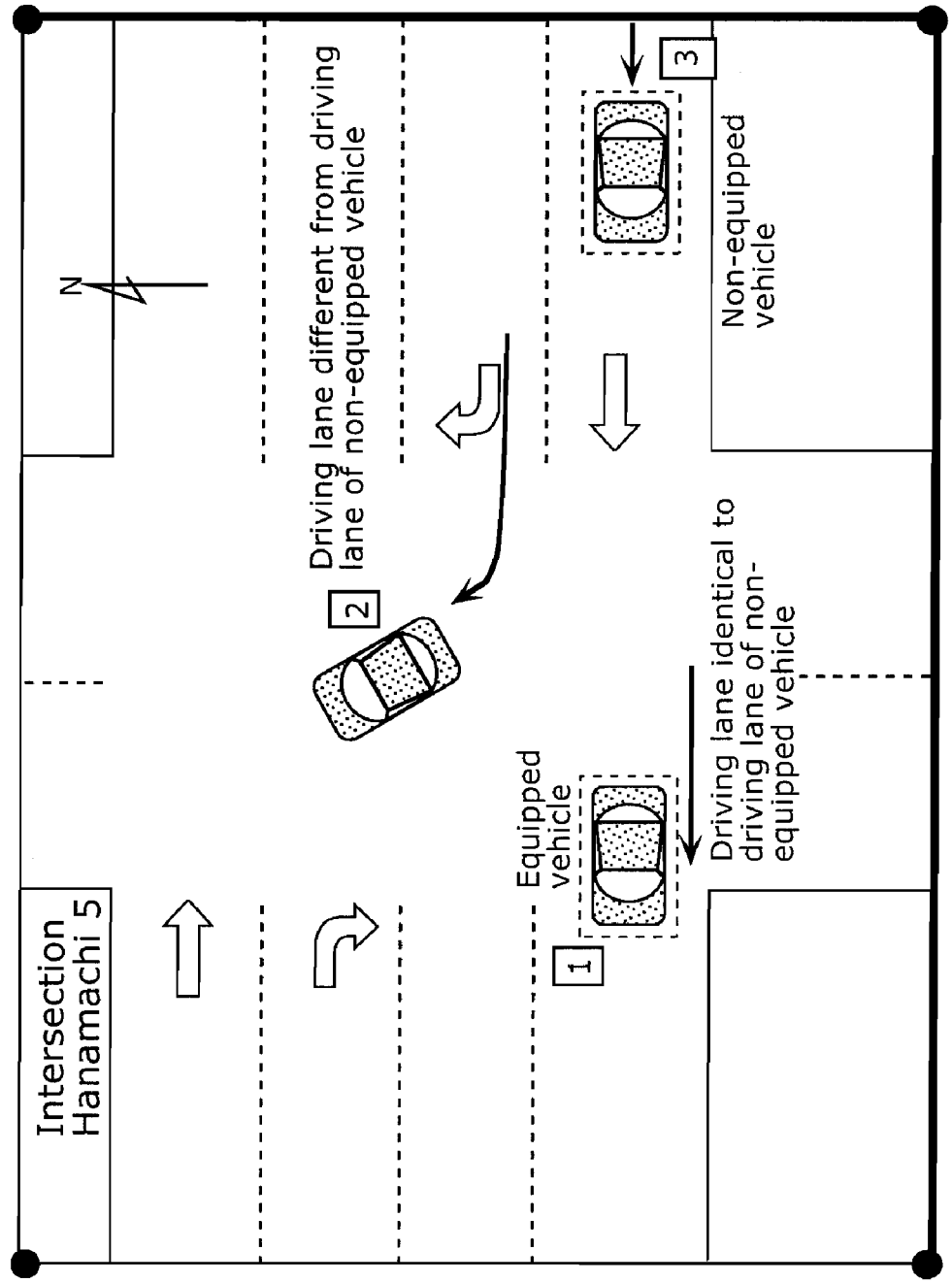
FIG. 17 shows an exemplary positional relation between the equipped vehicle which receives the non-equipped vehicle information and the non-equipped vehicle, at an intersection, in terms of driving lanes.

In the first embodiment, the vehicle whose moving direction is the same as that of the non-equipped vehicle is identified as the information-holding vehicle for receiving the non-equipped vehicle information. This is because the vehicle whose moving direction is the same as that of the non-equipped vehicle is likely to follow the non-equipped vehicle. The vehicle having the same moving direction is identified as the information-holding vehicle so that the non-equipped vehicle information is provided to the information-holding vehicle different from the non-equipped vehicle. This can avoid a collision and the like. For example, not only the information-holding vehicle whose moving direction is the same moving direction, but also the information-holding vehicle traveling in the same driving lane as the non-equipped vehicle, can be identified as the information-holding vehicle. Specifically, the equipped-vehicle detecting unit 112, as an exemplary equipped-vehicle detecting unit, further detects the driving lane of the road on which each equipped vehicle is traveling. The non-equipped-vehicle detecting unit 111, as an exemplary non-equipped-vehicle detecting unit, further detects the driving lane of the road on which the non-equipped vehicle is traveling. When the driving lane of the equipped vehicle detected by the equipped-vehicle detecting unit and the driving lane of the non-equipped vehicle detected by the non-equipped-vehicle detecting unit match each other, the destination matching degree determining unit 103, as the exemplary destination matching degree determining unit, determines that the equipped vehicle and the non-equipped vehicle match each other at a high degree in terms of destination. FIG. 17 shows an exemplary positional relation between the equipped vehicle which receives the non-equipped vehicle information and the non-equipped vehicle, at an intersection, in terms of driving lanes. Hereinafter, a description is given with reference to FIG. 17. FIG. 17 shows the intersection "Intersection Hanamachi 5". Intersection Hanamachi 5 has two driving lanes each way. The lane closer to the roadside is for straight-ahead vehicles. The center driving lane is for right-turning vehicles. The non-equipped-vehicle detecting unit 111 has detected the vehicle 3 as a non-equipped vehicle. At the same time, the equipped-vehicle detecting unit 112 has detected the vehicle 1 and the vehicle 2 as equipped vehicles. In this case, in order to avoid a collision with the non-equipped vehicle, the driving lane information is employed so that the information-holding vehicle identifying unit 113 identifies an information-holding vehicle for holding the non-equipped vehicle information, from among the equipped vehicles. The vehicle 3 that is the non-equipped vehicle is traveling on the straight-ahead driving lane. The vehicle 1 is similarly traveling on the straight-ahead driving lane. At the same time, the vehicle 2 is traveling on the right-turning driving lane. In this case, the information-holding vehicle identifying unit 113 identifies the vehicle 1 as the information-holding vehicle. This is because the vehicles traveling the same lane are likely to travel in the same direction. The information-holding vehicle can be identified based on the driving lanes, in such a manner.

For example, not only by detecting driving lanes, the information-holding vehicle can be identified by detecting a turn signal given by a direction indicator. The non-equipped-vehicle detecting unit 111 as the exemplary equipped-vehicle detecting unit further detects a turn signal given by a direction indicator included in each equipped vehicle. The non-equipped-vehicle detecting unit 111 as the non-equipped-vehicle detecting unit further detects a turn signal given by a direction indicator included in the non-equipped vehicle. When the turn signal of the equipped vehicle detected by the equipped-vehicle detecting unit and the turn signal of the non-equipped vehicle detected by the non-equipped-vehicle detecting unit match each other, the destination matching degree determining unit 103 as the exemplary destination matching degree determining unit determines that the matching degree between the destination of the equipped vehicle and the destination of the non-equipped vehicle is high.

Figure 18:
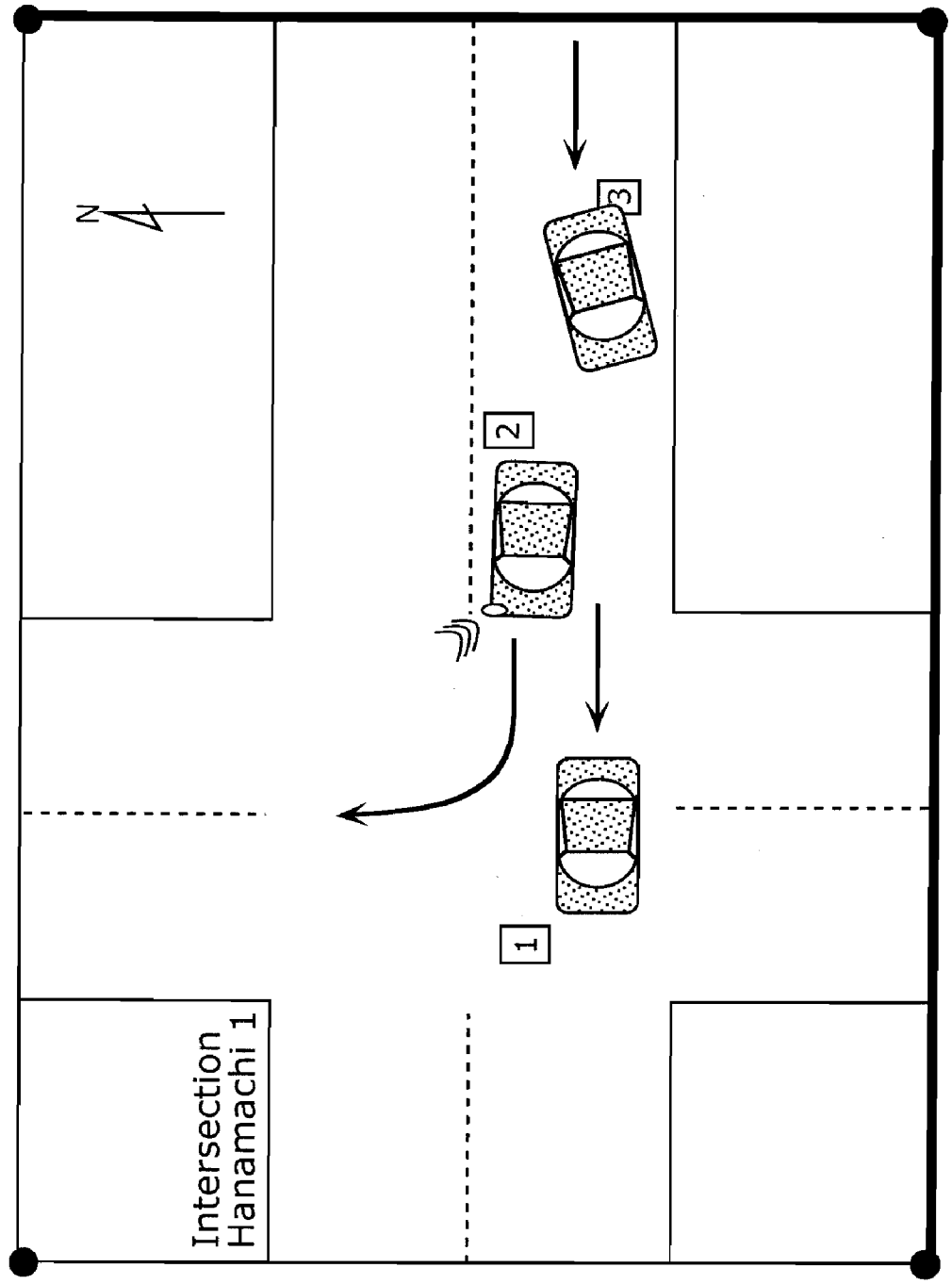
FIG. 18 shows an example in which the information-holding vehicle for holding the non-equipped vehicle information is identified by using turn signal information.

FIG. 18 shows an example in which the information-holding vehicle for holding the non-equipped vehicle information is identified by using the turn signal information. Hereinafter, a description is given with reference to FIG. 18. FIG. 18 shows the intersection "Intersection Hanamachi 1". In this case, the non-equipped-vehicle detecting unit 111 has detected the vehicle 3 as a non-equipped vehicle. At the same time, the equipped-vehicle detecting unit 112 has detected the vehicle 1 and the vehicle 2 as equipped vehicles. In this case, in order to avoid a collision with the non-equipped vehicle, the information-holding vehicle identifying unit 113 employs the turn signal information to identify an information-holding vehicle for holding the non-equipped vehicle information, from among the equipped vehicles. In FIG. 18, the vehicle 1 flashes neither its right-turning signal nor left-turning turn signal because the vehicle 1 is traveling straight ahead. The vehicle 2 flashes its right-turning signal for turning to the right. On the other hand, the vehicle 3 as the non-equipped vehicle, as the vehicle 1, flashes neither its right-turning signals nor left-turning turn signals. In other words, the vehicle 3 is likely to travel straight ahead. In this case, the information-holding vehicle identifying unit 113 identifies the vehicle 1 as the information-holding vehicle. By employing the turn signal information, the moving directions of each vehicle can be identified. By employing the turn signal information, the information-holding vehicle can also be identified. The non-equipped-vehicle detecting unit 111 and the equipped-vehicle detecting unit 112 can detect change in brightness caused by light or flash relatively easily in image recognition by employing a camera or the like. Since each vehicle generally employs turn signals to indicate where the vehicle goes next, the non-equipped vehicle information can be provided more accurately by employing the turn signal information to identify the information-holding vehicle. Furthermore, since turn signals flash at nighttime, in contrast to head lamp indicators on at all times, the moving direction of each vehicle can be identified by detecting their flashing lights. This allows the information-holding vehicle to be identified.

Cameras mounted on a vehicle or the like, which have a limited recognition range, cannot always recognize the presence of equipped and non-equipped vehicles and the moving directions thereof accurately. However, as shown in the first embodiment, for example, the roadside apparatus placed on an intersection or the like can recognize equipped and non-equipped vehicles over a wide range. Furthermore, the roadside apparatus can recognize the moving directions of the equipped and non-equipped vehicles by following their driving lanes and turn signals. Based on this recognition result, the travel support system can identify the most suitable one for the information-holding vehicle, from among the equipped vehicles, so that the non-equipped vehicle information is provided thereto.

Furthermore, various types of information are exchanged at an intersection or the like. The information includes not only the non-equipped vehicle information according to the first embodiment, but also information exchanged with a pedestrian such as a child on a crosswalk. Therefore, excessive information exchange is favorably avoided. The presence of the non-equipped vehicle is notified not to all the surrounding vehicles, but to the specific vehicle as shown in the first embodiment, so that excessive information exchange is avoided, thereby preventing a collision appropriately.

Second Embodiment

In the first embodiment, among from the vehicles of which images are recognized, the vehicle whose destination matches with the destination of the non-equipped vehicle is identified as the information-holding vehicle. The non-equipped vehicle information is provided to the information-holding vehicle. In the second embodiment, a description is given for a method of predicting the destination of each vehicle by using the movement history thereof so as to identify the information-holding vehicle, and then providing the non-equipped vehicle information to the information-holding vehicle.

Figure 19:
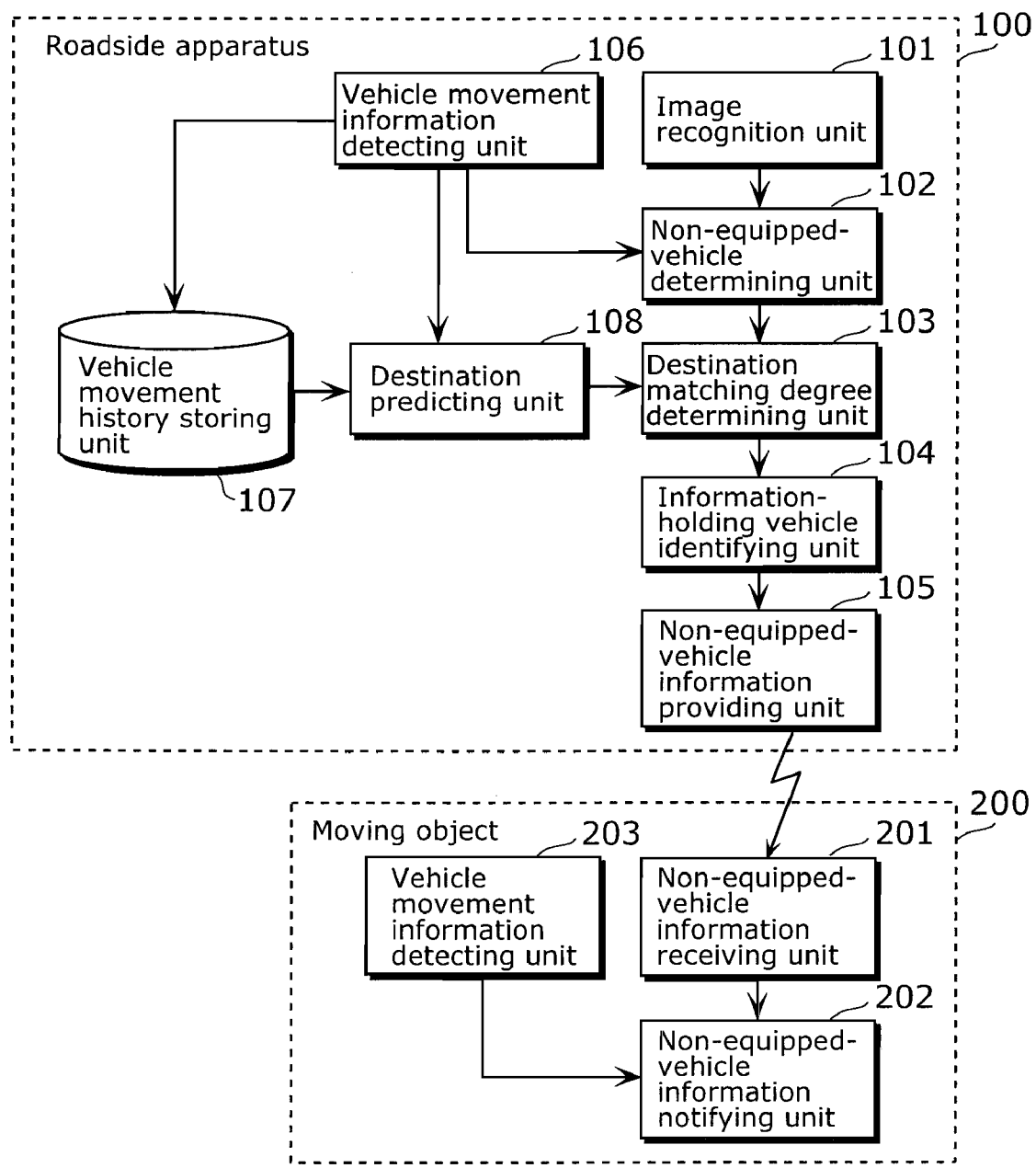
FIG. 19 is a block diagram showing the configuration of a travel support system according to the second embodiment, in which a matching degree of destinations is determined by using movement histories to identify an information-holding vehicle.

FIG. 19 shows a system configuration according to the second embodiment. In addition to the constituent elements shown in the first embodiment, a vehicle movement history storing unit 107 and a destination predicting unit 108 are further included. The constituent elements shown in the first embodiment have the same numbers also in the second embodiment, and their description is omitted here.

The vehicle movement history storing unit 107 is an exemplary movement history storing unit which stores the movement histories of equipped and non-equipped vehicles, based on the position of each equipped vehicle detected by the equipped-vehicle detecting unit, and based on the position of the non-equipped vehicle detected by the non-equipped-vehicle detecting unit. The vehicle movement history storing unit 107 stores the position information of each vehicle detected by the vehicle movement information detecting unit 106 as the movement history of the vehicle. The position information detected from each vehicle indicates which route the vehicle has passed through, how much time has been required for passing through the route, and the like. There is known a conventional probe-car-related technique of storing position information so that the position information is employed as more accurate traffic information. For example, the movement history through a predetermined route is provided to a roadside apparatus or the like so that the time required for passing through the route is calculated accurately. This can provide more accurate traffic information or the like to another vehicle. Furthermore, by storing a movement history for each user, the user can search a past transit across the user's own movement history, can make a route setting to be affected by the past transit route, for example. Furthermore, the movement history stored for each user is affected by the user's behavior pattern. Based on the movement history, the user's future destination can be predicted. Furthermore, based on the histories obtained from other users, their general future destinations and the like can be predicted, when the users pass through a specific route.

The destination predicting unit 108 is an exemplary destination predicting unit which predicts the destinations of equipped and non-equipped vehicles, based on the movement histories of the equipped and non-equipped vehicles stored in the movement history storing unit. The destination predicting unit 108 predicts the destination of each vehicle based on the movement histories stored in the vehicle movement history storing unit 107. Hereinafter, a description is given with reference to the drawings.

Figure 20:
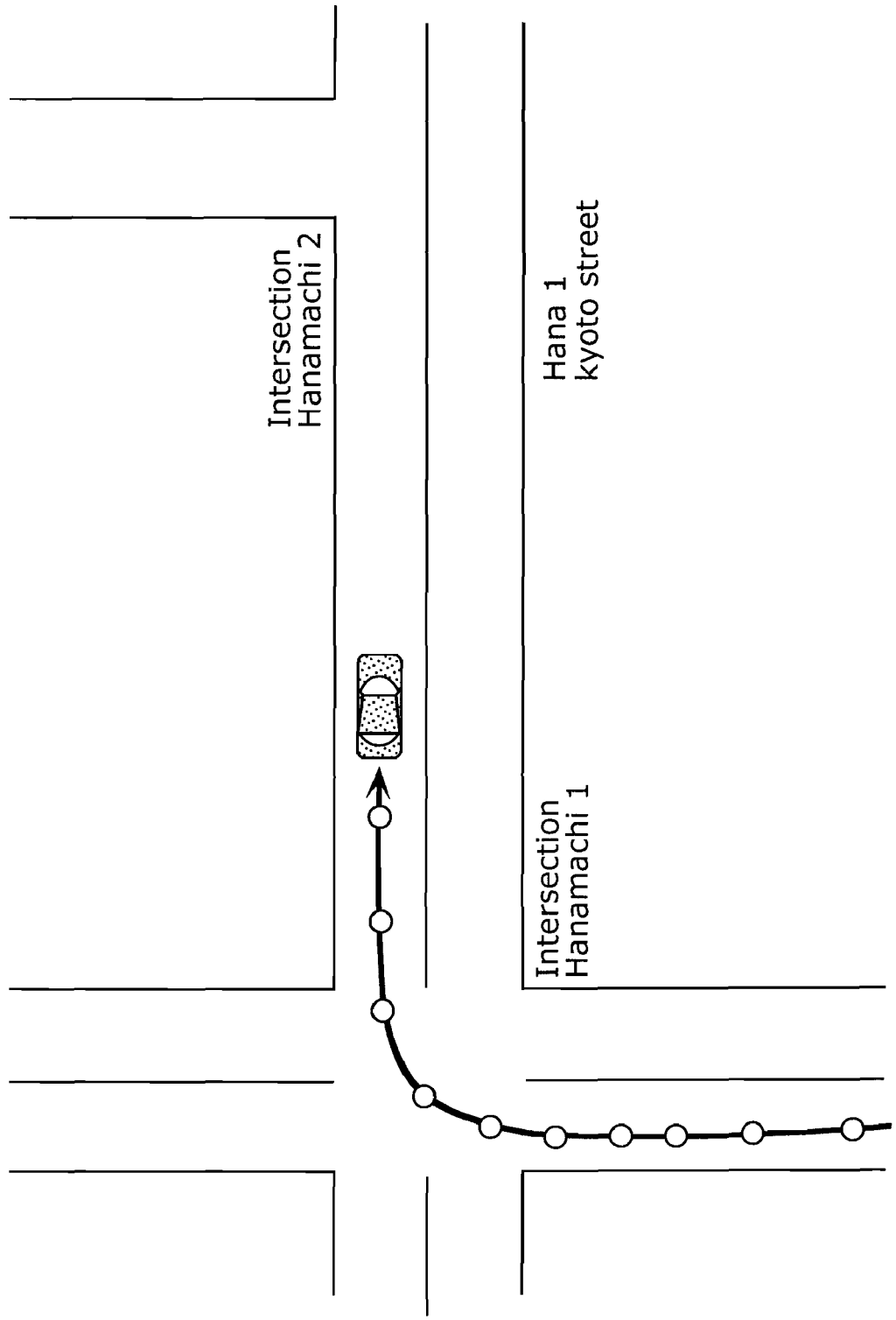
FIG. 20 illustrates the movement histories stored in a vehicle movement history storing unit.

FIG. 20 illustrates the movement histories stored in the vehicle movement history storing unit 107. For example, the GPS or the like included in each vehicle generally detects latitude-longitude information at a predetermined interval (for example, one second), based on the user movement. In FIG. 20, a user is turning to the right at Intersection Hanamachi 1. During that time, position information is detected. The detected position information is shows by white circles. When the position information is detected at the predetermined interval, for example one second, an enormous amount of information is accumulated. Furthermore, the position information has latitude and longitude errors. Therefore, the position information is not always suitable for search or matching. Accordingly, in the second embodiment, for example, the position information is stored by converting into a node sequence in which intersections or the like are employed as nodes.

Figure 21:
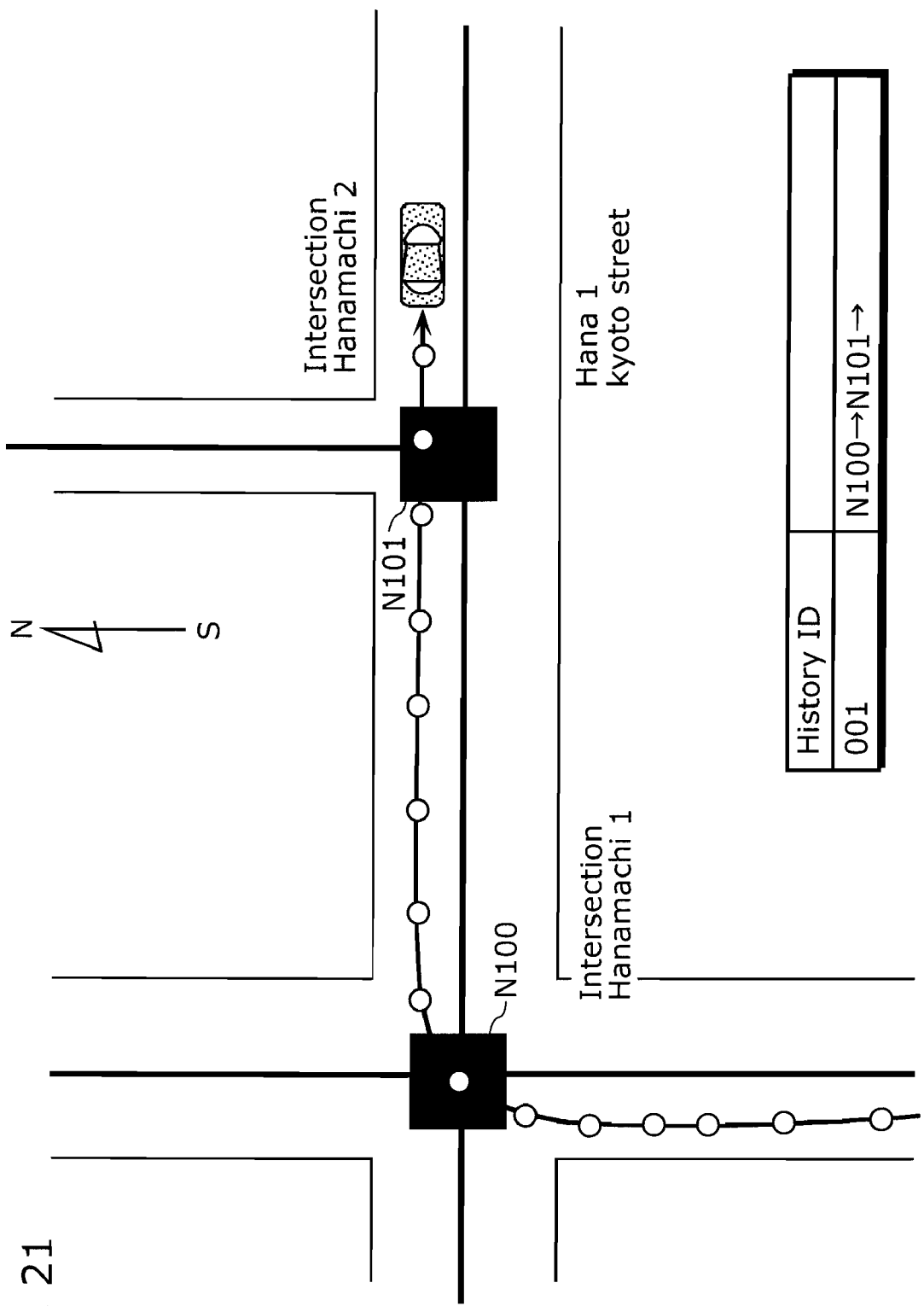
FIG. 21 shows an example in which detected position information is converted into a node sequence.

FIG. 21 shows an example in which detected position information is converted into a node sequence. In FIG. 21, a user has turned to the right at Intersection Hanamachi 1 to travel straight ahead, and then just has passed through Intersection Hanamachi 2. The movement of the user is followed so that position information is detected. On the other hand, map information, which is included in a car navigation system or the like, employs intersections and facilities as nodes. The map information generally includes road network information constructed by linkages which connects one node with another. Each node or linkage in the road network information has a unique ID. For example, the ID of Intersection Hanamachi 1 is "N (node) 100", and the ID of Intersection Hanamachi 2 is "N101". In the second embodiment, the detected position information is converted into nodes by matching. This node sequence is stored as movement histories. For example, the history ID "001" is converted into "N100→N101", and then stored as a movement history. FIGS. 22(a)-(c) show exemplary movement histories stored in the vehicle movement history storing unit 107 as a node sequence. For example, the history ID "001" has a transit history that the vehicle corresponding to the history ID "001" starts from the starting point "N201", via the routes "N202", "N203", and the like, and then reaches the destination "N220".

The destination predicting unit 108 predicts a future destination, based on the movement histories stored in the vehicle movement history storing unit 107 and the current transits detected by the vehicle movement information detecting unit 106.

Referring to FIG. 22(a), the vehicle movement history storing unit 107 stores the movement histories as shown above. At the same time, a given vehicle, currently traveling, has started from "N201" and passed through "N202", "N203", "N204", "N205", and "N206", as shown in FIG. 22(b). In this case, as shown in FIG. 22(a), the destination predicting unit 108 searches for a matching route across the movement histories stored in the vehicle movement history storing unit 107 to predict a subsequent destination. In this example, the transit up to the current time shown in FIG. 22(b) matches with the transit having the history ID "001". As shown in FIG. 22(c), a prediction can be made that the vehicle corresponding to the history ID "001" will pass through "N207", "N208", "N209", and "N210", and finally reach the destination "N220".

The information-holding vehicle identifying unit 104 identifies the information-holding vehicle for holding the non-equipped vehicle information. In the forgoing embodiment, the destination matching degree determining unit 103 determines a matching degree of destinations to identify the information-holding vehicle. In the second embodiment, by employing the destinations predicted by the destination predicting unit 108, a matching degree of destinations is determined to identify the information-holding vehicle. Hereinafter, a description is given with reference to the drawings.

Figure 23:
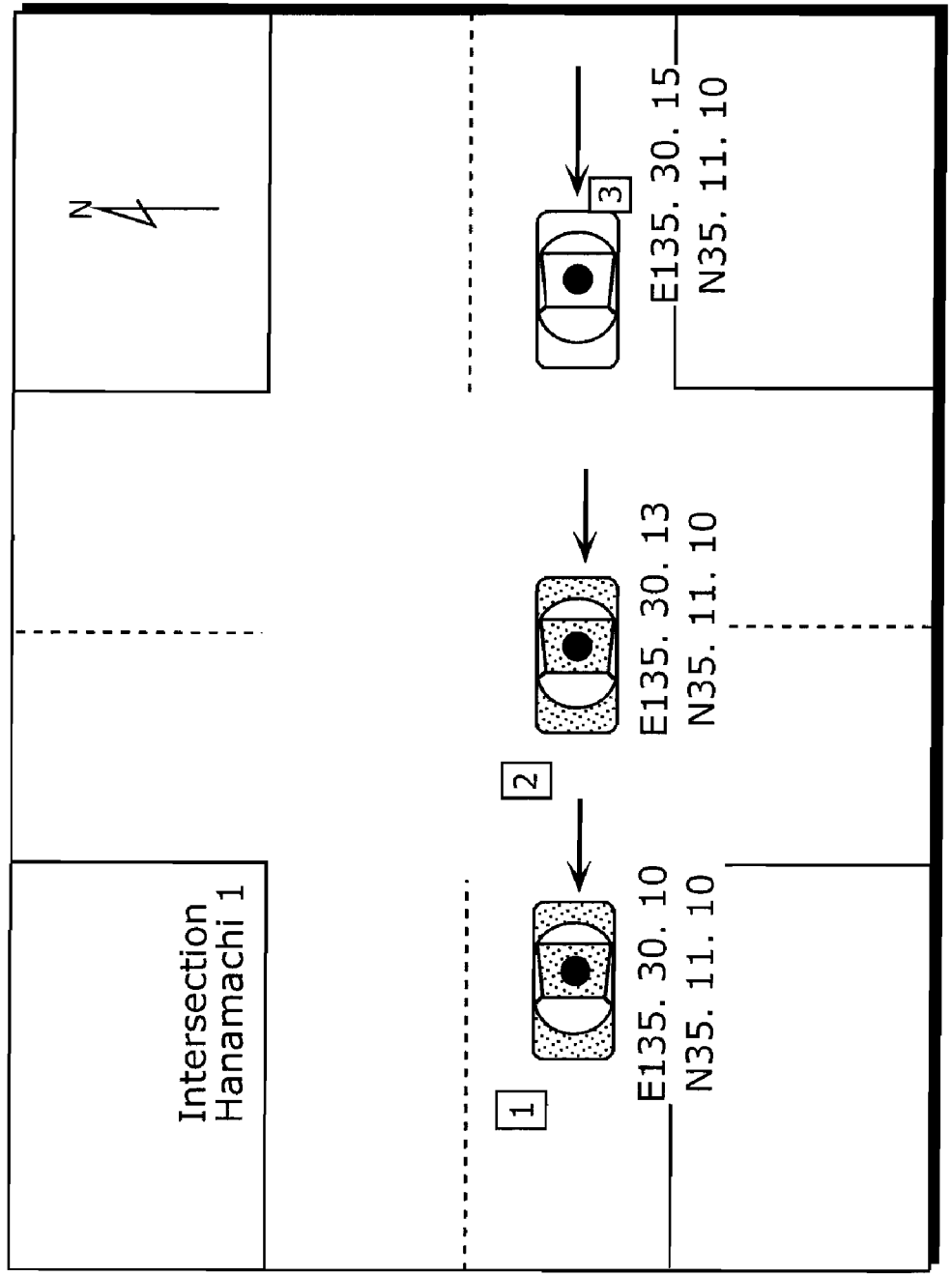
FIG. 23 shows an exemplary image of Intersection Hanamachi 1 recognized by the image recognition unit.

FIG. 23 shows an exemplary image of Intersection Hanamachi 1 recognized by the image recognition unit 101. As in FIG. 3, FIG. 23 shows an image of Intersection Hanamachi 1. In this image, a vehicle 1, a vehicle 2, and a vehicle 3 are extracted as moving images. The positions of the moving objects are: (E135.30.10, N35.11.10); (E135.30.13, N35.11.10); and (E135.30.15, N35.11.10). The fact that the moving objects are traveling from the east to the west along Intersection Hanamachi 1, is obtained by calculation, as the moving directions of the moving objects. At the same time, the vehicle movement information detecting unit 106 detects the position information transmitted from each vehicle. FIGS. 24(a)-(c) show an exemplary the position information of the detected equipped and non-equipped vehicles. FIG. 24(a) shows exemplary position information transmitted from the vehicle 1 and the vehicle 2 that are equipped vehicles. FIG. 24(b) shows exemplary position information of the vehicle 1, and the vehicle 2, and the vehicle 3, detected by the image recognition unit 101 by image processing. FIG. 24(c) shows exemplary position information of the detected non-equipped vehicle. In FIG. 24(a), the position information detected from the vehicle 1 includes: "001" as a vehicle ID; (E135.30.10, N35.11.10) as a position; "west" as a moving direction, and "50 km/h" as a speed. Similarly, the position information detected from the vehicle 2 includes: "002" as a vehicle ID; (E135.30.13, N35.11.10) as a position; "west" as a moving direction; and "50 km/h" as a speed. Here, the difference is obtained, between the position detected by the vehicle movement information detecting unit 106 and the position information shown in FIG. 24(b) image-recognized by the image recognition unit 101. As a result, as shown in FIG. 24(c), the vehicle 3 of which position information includes: "003" as a recognition ID; (E135.30.15, N35.11.10) as a position; "west" as a moving direction; and "50 km/h" as a speed, is identified as the non-equipped vehicle.

In the foregoing embodiment, a destination matching degree is employed so that the destination matching degree determining unit 103 identifies the information-holding vehicle. In this example, the moving direction of the vehicle 3 that is a non-equipped vehicle (hereinafter, referred to as a "non-equipped vehicle 3") is west. Since the moving directions of the vehicle 1 and the vehicle 2 match each other, the vehicle 1 and the vehicle 2 become candidates for the information-holding vehicle. Furthermore, the vehicle 2 of which position is the closest to the position of the non-equipped vehicle 3, is identified as the information-holding vehicle, for example. However, the movement of each vehicle cannot be accurately predicted only based on the movement thus recognized by the roadside apparatus. Therefore, the vehicle 2 is sometimes inappropriate as the information-holding vehicle. For example, in FIG. 24, the vehicle 2 is the closest to the non-equipped vehicle 3 and the moving directions thereof match each other at Intersection Hanamachi 1. However, the vehicle 2 may turn to the right or left to take a route different from the route taken by the non-equipped vehicle 3. This is why the vehicle 2 is not suitable as the information-holding vehicle. Therefore, in the second embodiment, a destination matching degree is further determined by using the destinations predicted by the destination predicting unit 108.

Figure 25:
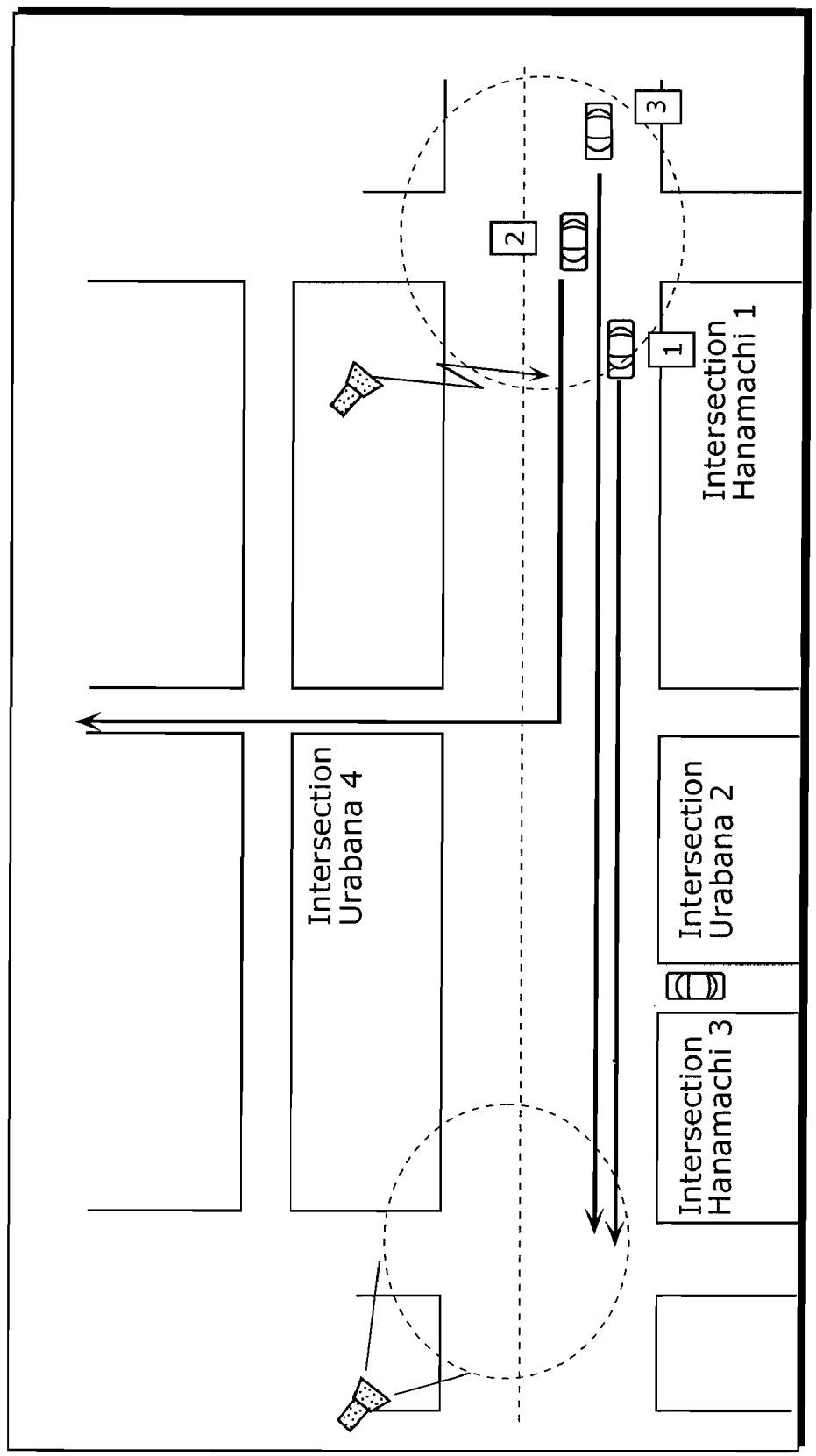
FIG. 25 shows the destination of each vehicle predicted by a destination predicting unit.

FIG. 25 shows the destination of each vehicle predicted by the destination predicting unit 108. First, the destinations of the vehicle 1 and the vehicle 2 are predicted based on the movement history of each vehicle, as described above. For example, a destination prediction is made that the vehicle 1 may pass through Intersection Hanamachi 1, and then travel straight ahead through Intersection Urabana 2 toward Intersection Hanamachi 3. At the same time, another destination prediction is made based on movement history of the vehicle 2, that the vehicle 2 may pass through Intersection Hanamachi 1, and then turn to the right at Intersection Urabana 2 toward Intersection Urabana 4.

On the other hand, since the vehicle 3 is a non-equipped vehicle having no communication module, the vehicle 3 can neither store its movement history, nor predict its destination accurately based on the history. Therefore, the destination of the non-equipped vehicle 3 can only be estimated, not predicted. For example, an estimate is made that the vehicle 3 may travel ahead through Intersection Hanamachi 1. Alternatively, based on the movement histories obtained from the other equipped vehicles, a general destination can be predicted by employing frequency or the like, so that the predicted destination is employed as the destination of the non-equipped vehicle for estimate.

As stated above, the destination matching degree determining unit 103 calculates the destination matching degree between the predicted and estimated destinations. The information-holding vehicle identifying unit 104 identifies the information-holding vehicle. In this case, the non-equipped vehicle 3 may travel straight ahead up to Intersection Hanamachi 3 by estimate, while the vehicle 2 turns to the right at Intersection Hanamachi 2. On the other hand, the transit of the non-equipped vehicle 3 matches the transit of the vehicle 1 up to Intersection Hanamachi 3. Therefore, the vehicle 1 is identified as the information-holding vehicle. The vehicle 2, turning to the right at Intersection Hanamachi 2, travels away from the non-equipped vehicle. This means that the vehicle 2 does not need to hold the information about the presence of the non-equipped vehicle any longer.

Figure 26:
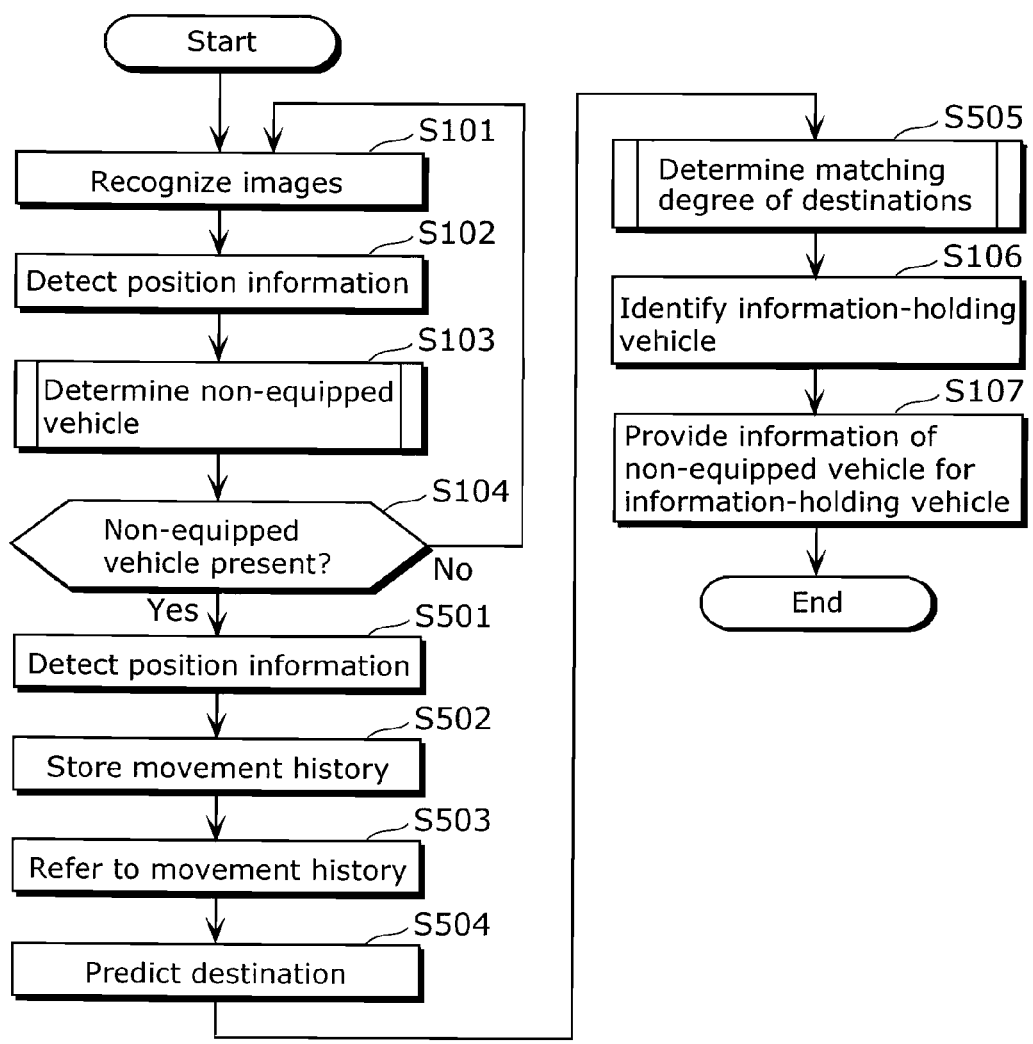
FIG. 26 is a flow chart showing an exemplary operation of the entire travel support system according to the second embodiment.
Figure 27:
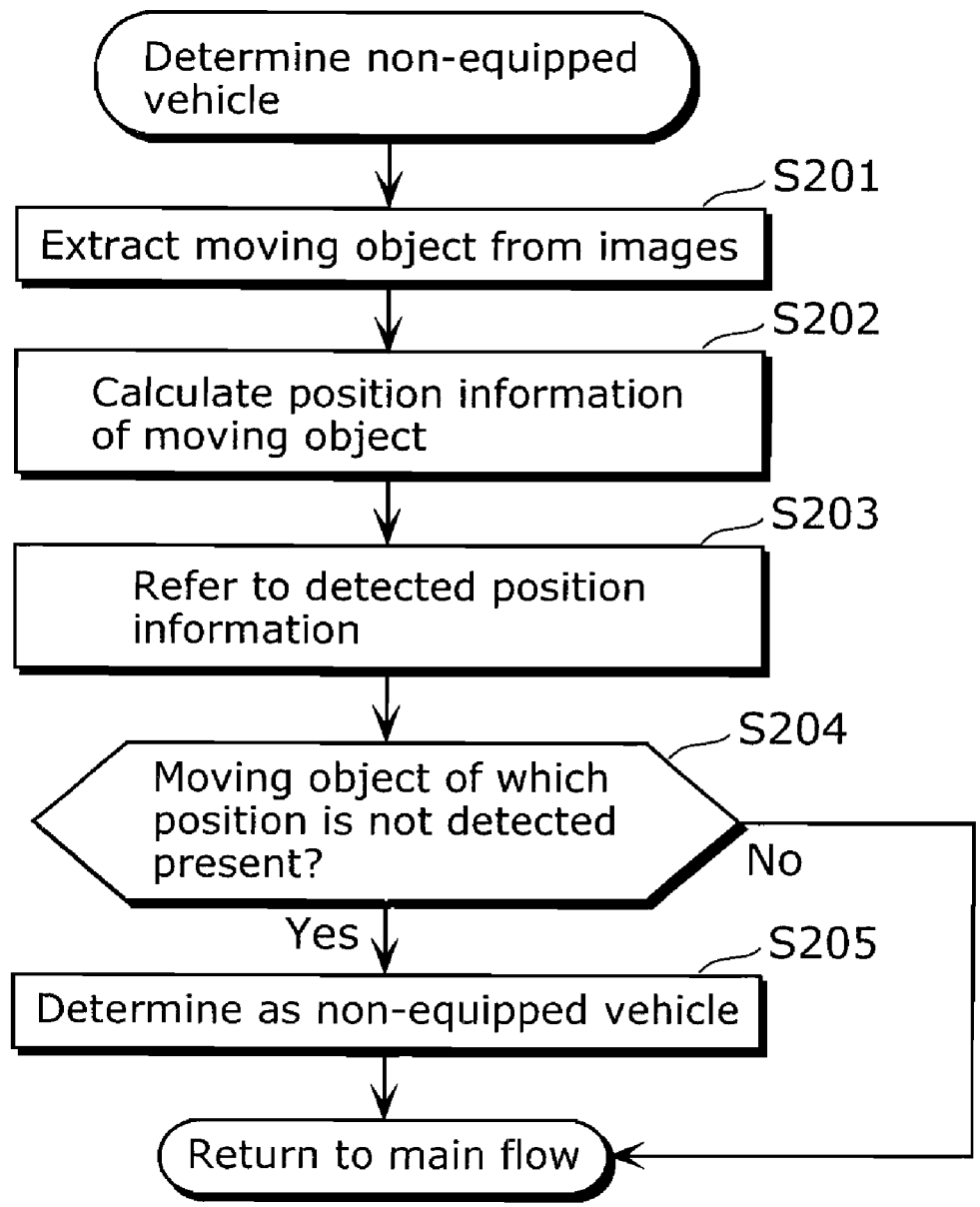
FIG. 27 is a flow chart showing an exemplary non-equipped vehicle determination operation to be made by the non-equipped-vehicle determining unit 102 in Step 103 of FIG. 26.
Figure 28:
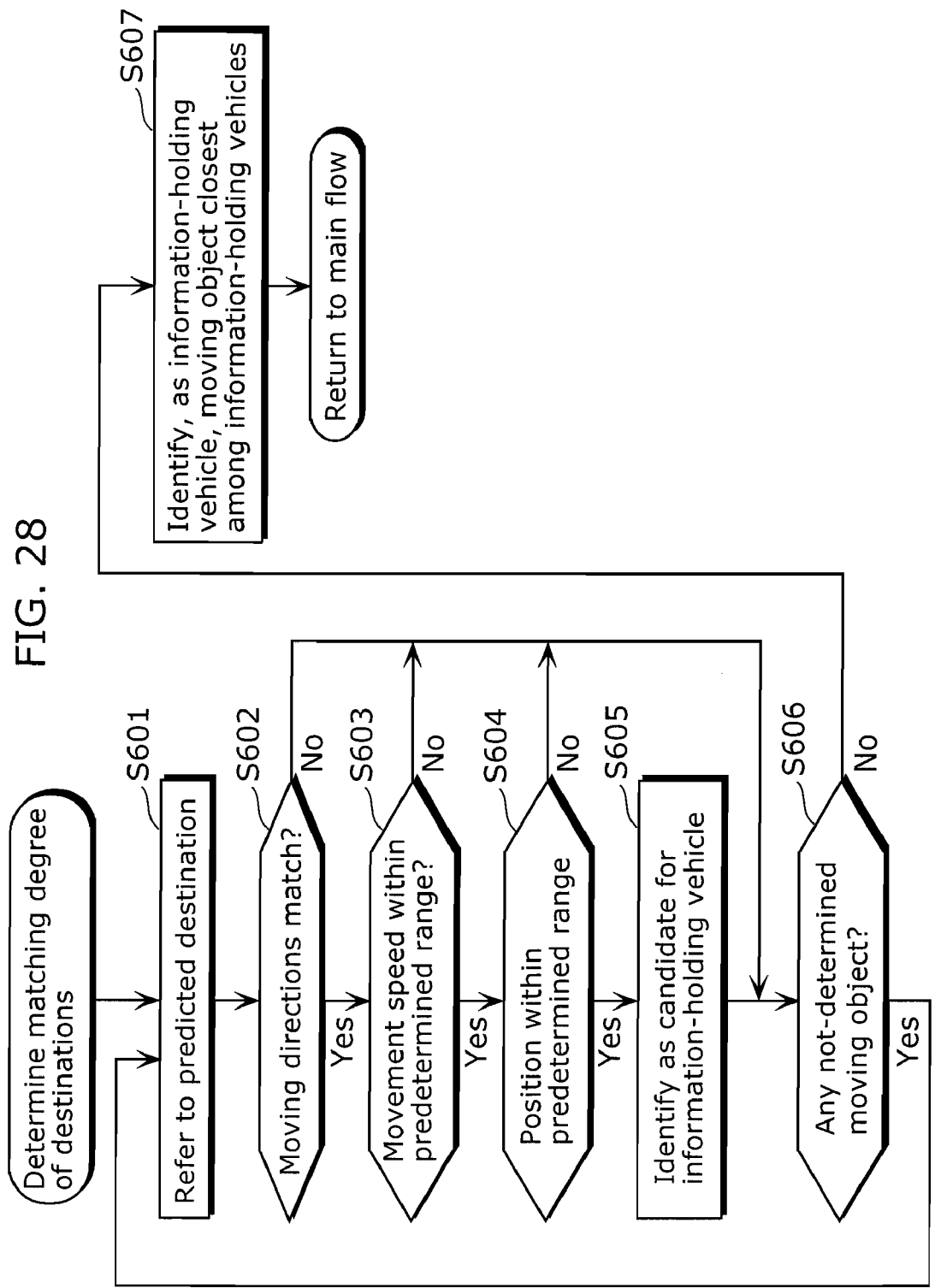
FIG. 28 is a flow chart showing an exemplary operation of a destination matching degree determining unit in Step 105 of FIG. 26.
Figure 29:
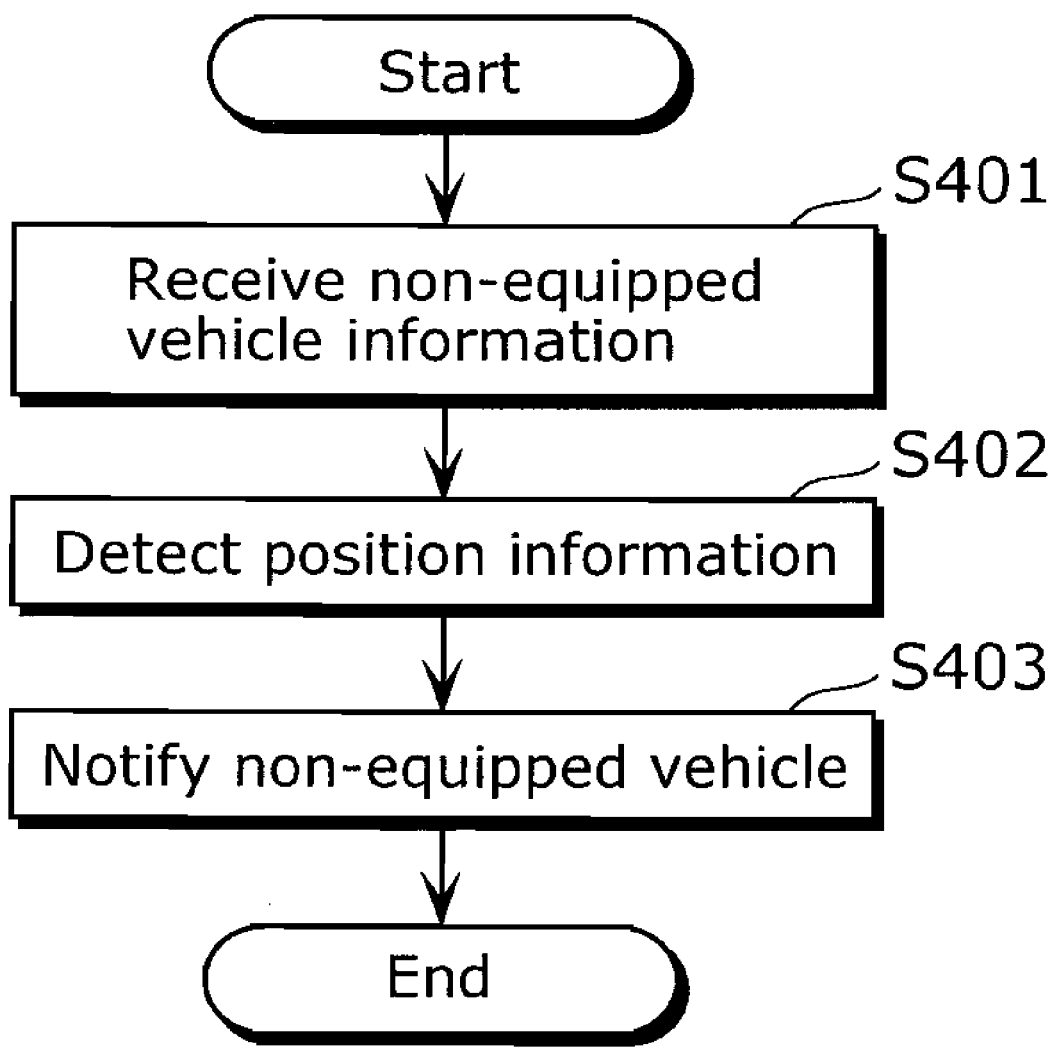
FIG. 29 is a flow chart showing an exemplary operation of the equipped vehicle to be performed when the equipped vehicle receives the information regarding the non-equipped vehicle whose destination matches the destination of the equipped vehicle, from the non-equipped-vehicle information providing unit.

Hereinafter, operations according to the present invention are described with reference to the flow charts of FIG. 26, FIG. 27, FIG. 28, and FIG. 29. FIG. 26 is a flow chart showing an exemplary operation of the entire travel support system according to the second embodiment. FIG. 27 is a flow chart showing an exemplary non-equipped vehicle determination operation to be made by the non-equipped-vehicle determining unit 102 in Step 103 of FIG. 26. FIG. 28 is a flow chart showing an exemplary operation of the destination matching degree determining unit 103 in Step 105 of FIG. 26. FIG. 29 is a flow chart showing an exemplary operation of the equipped vehicle 200 to be performed when the equipped vehicle 200 receives the information regarding the non-equipped vehicle whose destination matches the destination of the equipped vehicle 200, from the non-equipped-vehicle information providing unit 105.

First, the image recognition unit 101 recognizes images (Step S101). On the other hand, the vehicle movement information detecting unit 106 detects the position information of each vehicle (Step S102). Based on the image information and the position information, the non-equipped-vehicle determining unit 102 determines a non-equipped vehicle (Step S103). These three steps are the same as in the forgoing embodiment.

Referring to FIG. 27, in order to determine a non-equipped vehicle, as in the forgoing embodiment, as shown in FIG. 13, first, vehicle images are extracted from the image information (Step S201). The position information of the extracted vehicle images is calculated (Step S202). On the other hand, the position information detected by the vehicle movement information detecting unit 106 is referred to (Step S203). A determination is made whether or not any moving object of which position information has not been detected is present (Step S204). When no such moving object is present (Step S204: No), this means that no non-equipped vehicle is present. The operation returns to the main flow. On the other hand, when any such moving object is present (Step S204: Yes), the moving object is determined as a non-equipped vehicle (Step S205). The operation then returns to the main flow.

Turning back to FIG. 26, when any non-equipped vehicle is present (Step S104: Yes), the operation moves on to Step S105. When no non-equipped vehicle is present (Step S104: No), the operation returns to Step S101 to repeat the steps of vehicle detection to non-equipped vehicle determination (Step S101 to Step S104).

When any non-equipped vehicle is present (Step S104: Yes), the vehicle movement information detecting unit 106 detects the position information of the vehicle (Step S501). The vehicle movement history storing unit 107 then stores the detected position information (Step S502). Next, the movement history is referred to (Step S503). The destination predicting unit 108 predicts the destination of the vehicle (Step S504).

Next, based on the predicted vehicle destination, the destination matching degree determining unit 103 determines the matching degree of destinations (Step S505).

As described above, each vehicle having a vehicle-to-vehicle communication module can predict the future destination of the vehicle, based on the detected position information and movement history thereof. For example, as shown in FIG. 25, a prediction is made that the equipped vehicle 1 may travel straight ahead through Intersection Hanamachi 1, toward Intersection Urabana 2 and Intersection Hanamachi 3. Another prediction is made that the equipped vehicle 2 may turn to the right at Intersection Hanamachi 2. On the other hand, an estimate is made that the non-equipped vehicle 3 may travel straight ahead up to Intersection Hanamachi 3. These predicted and estimated destinations are referred to so that the matching degree of destinations is determined. The information-holding vehicle is thus identified.

As illustrated in FIG. 28, first the predicted and estimated destinations are referred to (Step S601). A determination is made whether or not the moving direction of one equipped vehicle matches the moving direction of the non-equipped vehicle (Step S602). When the moving directions match (Step S602: Yes), the operation moves on to Step S603. When the moving directions do not match, the operation moves on to Step S S606. When the moving directions match (Step S602: Yes), next, a determination is made whether or not the moving speed of the equipped vehicle is within a predetermined range (Step S603). When the moving speed is within the predetermined range (Step S603: Yes), the operation moves on to Step S604. When the moving speed is beyond the range, the operation moves on to Step S606. When the moving speed is within the range (Step S603: Yes), next, a determination is made whether or not the position of the equipped vehicle is within a predetermined range (Step S604). When the position is within the predetermined range (Step S604: Yes), the operation moves on to Step S605. When beyond the range, the operation moves on to Step S606. When the moving direction, the speed, and the position meet the above conditions as mentioned above, the equipped vehicle is identified as a candidate for the information-holding vehicle (Step S605).

Next, a determination is made whether or not any other vehicle which has not been determined yet is left (Step S606). When any undetermined vehicle is left (Step S606: Yes), the operation returns to Step S601 to determine the undetermined vehicle. On the other hand, when the matching degree of destinations has been determined between the non-equipped vehicle and all the equipped vehicles (Step S606: No), one of the equipped vehicles, of which position is the closest to the position of the non-equipped vehicle among the candidates for the information-holding vehicle, is identified as the information-holding vehicle (Step S607). The operation then returns to the main flow.

In the example shown as FIG. 25, the vehicle 2 turns to the right at Intersection Hanamachi 2. On the other hand, the transit of the non-equipped vehicle 3 matches the transit of the vehicle 1 up to Intersection Hanamachi 3. Therefore, the vehicle 1 is identified as the information-holding vehicle. The vehicle 2, turning to the right at Intersection Hanamachi 2, travels away from the non-equipped vehicle. This means that the vehicle 2 does not need to hold the information about the presence of the non-equipped vehicle any longer. The vehicle 2 can also be identified as the information-holding vehicle. In this case, the non-equipped vehicle is deleted at the point when the vehicle 2 turns to the right or left.

As in the forgoing embodiment, the vehicle identified in the above flow is identified by the information-holding vehicle identifying unit 104 as the information-holding vehicle (Step S106). The non-equipped vehicle information is provided to the information-holding vehicle (Step S107). Furthermore, as illustrated in FIG. 29, in the vehicle identified as the information-holding vehicle, the non-equipped-vehicle information receiving unit 201 receives the non-equipped vehicle information (Step S401). The vehicle movement information detecting unit 203 then detects position information of another equipped vehicle (Step S402). The non-equipped-vehicle information notifying unit 202 notifies the non-equipped vehicle information (Step S403).

Modified Example 1

Figure 30:
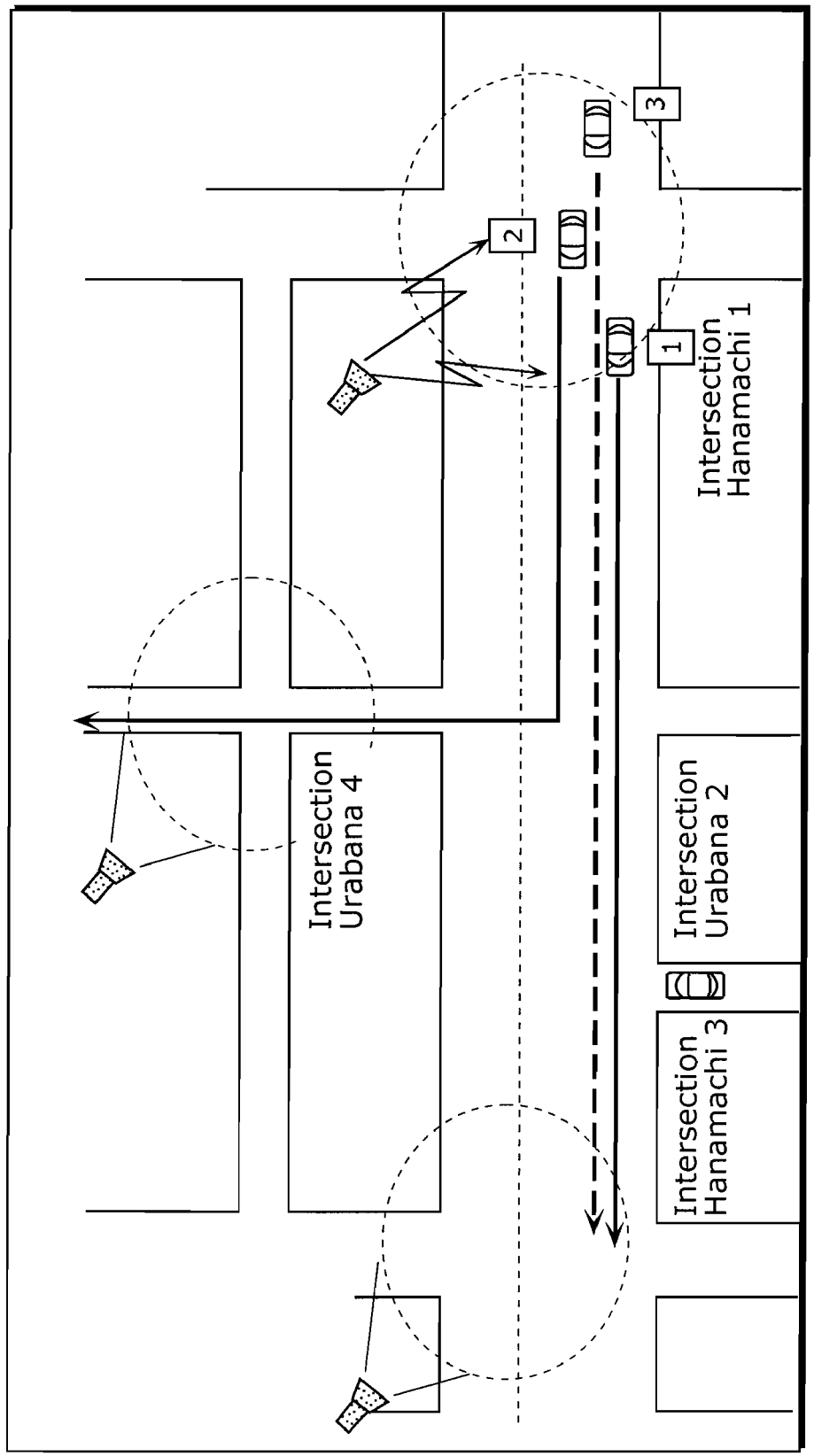
FIG. 30 shows an exemplary image of Intersection Hanamachi 1, recognized by the image recognition unit.

Although the first and second embodiments have described the case in which only one information-holding vehicle is employed, the present invention is not limited to the case. A plurality of vehicles can be identified as information-holding vehicles. By the identified information-holding vehicles, the non-equipped vehicle information can be notified reliably. Hereinafter, a description is given with reference to the drawings. FIG. 30 shows an exemplary image of Intersection Hanamachi 1 recognized by the image recognition unit 101. As in FIG. 25, FIG. 30 shows vehicle routes at Intersection Hanamachi 1 and the like. As in FIG. 25, the three vehicles are detected at Intersection Hanamachi 1: a vehicle 1, a vehicle 2, and a vehicle 3. The non-equipped-vehicle determining unit 102 determines that the vehicle 3 is a non-equipped vehicle. Furthermore, the destination predicting unit 108 predicts that the vehicle 1 may travel straight ahead through Intersection Hanamachi 1, Intersection Urabana 2 and Intersection Urabana 3. On the other hand, a prediction is made that the vehicle 2 may turn to the right at Intersection Urabana 2 toward Intersection Urabana 4. In addition, an estimate is made that the vehicle 3 may travel straight ahead. In the forgoing embodiments, the vehicle 1 is identified as the information-holding vehicle because the destination of the vehicle 1 matches the destination of the vehicle 3 estimated to travel straight ahead. However, the destination of the non-equipped vehicle which is equipped with no communication module can only be estimated. The non-equipped vehicle destination is not always estimated accurately. For example, the vehicle 3 possibly turns to the right at Intersection Urabana 2. Accordingly, the equipped vehicles which travel to each destination are identifies as information-holding vehicles. In this case, since the predicted destinations of the vehicles 1 and 2 are different from each other, the vehicles 1 and 2 are identified as the information-holding vehicles. Even in the case where the non-equipped vehicle 3 does not travel straight ahead to turn to the right at Intersection Urabana 2, the vehicle 2 is also identified as the information-holding vehicle so as to hold the non-equipped vehicle information. This can avoid a collision with another vehicle. In this example, the destination predicting unit 108 predicts the destinations of vehicles which approach the different destinations. The destination predicting unit 108 provides the non-equipped vehicle information to the vehicles. Furthermore, a destination difference determining unit which determines whether or not vehicles approach different destinations or the like can be provided separately to identify the information-holding vehicle.

Figure 31:
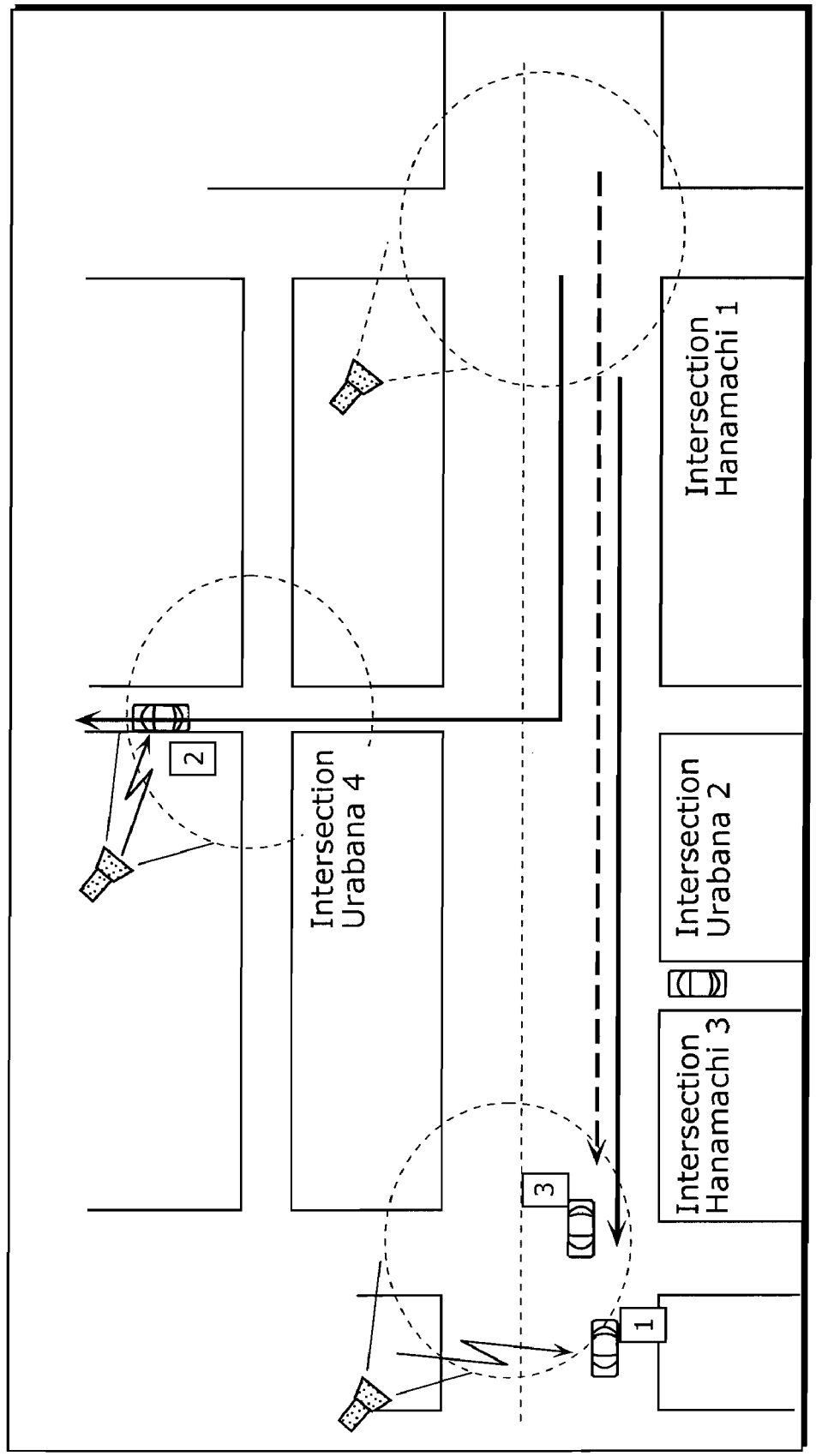
FIG. 31 shows an exemplary event at which the information-holding vehicle traveling to the destination different from the destination of the non-equipped vehicle shown by the non-equipped vehicle information, deletes unnecessary non-equipped vehicle information.

In the case where the non-equipped vehicle information is simply provided to the vehicles which approach different destinations, the amount of information becomes enormous, thereby possibly losing the information reliability. For example, in FIG. 30, identification cannot be made whether the non-equipped vehicle 3 may travel straight ahead through Intersection Urabana 2, or turn to the right at Intersection Urabana 2. Therefore, the information of the non-equipped vehicle 3 is notified to the vehicles whose predicted destinations are different, such as the vehicle 1 predicted to travel straight ahead through Intersection Urabana 2 and the vehicle 2 predicted to turn to the right at Intersection Urabana 2. Since the vehicle 3 actually travels in either one of the directions, the piece of non-equipped vehicle information corresponding to the other direction becomes unnecessary. Furthermore, this example describes the case which employs two vehicles, whose destinations are different. However, in the case where more vehicles are involved whose destinations are different, when the non-equipped vehicle information is notified to all these vehicles, the information is carried to all the destinations. Under an environment in which vehicle-to-vehicle communication system is widely available, the risk of a collision with a non-equipped vehicle unable to carry out vehicle-to-vehicle communication is high. By thus notifying the information to the vehicles whose destinations are different, such a risk can be avoided in terms of fail-safe design. On the other hand, the unnecessary piece of non-equipped vehicle information has to be deleted or modified. Accordingly, for example, the roadside apparatus placed on the next intersection or the like modifies or deletes the unnecessary non-equipped vehicle information, so as to prevent the unnecessary piece of non-equipped vehicle information from affecting the whole non-equipped vehicle information, thereby maintaining the reliability of the information. FIG. 31 shows an exemplary event at which the information-holding vehicle traveling to the destination different from the destination of the non-equipped vehicle indicated by the non-equipped vehicle information, deletes the unnecessary non-equipped vehicle information. Hereinafter, a description is given with reference to FIG. 31. The vehicle movement information detecting unit 203 is an exemplary event detecting unit which detects an event at which the non-equipped vehicle information held by the information-holding vehicle is deleted. A set of the non-equipped-vehicle information receiving unit 201 and the non-equipped-vehicle information notifying unit 202 shows one of the examples of an information deletion unit which deletes the non-equipped vehicle information held by the information-holding vehicle when the vehicle movement information detecting unit 203 as the exemplary event detecting unit, detects the event. The vehicle movement information detecting unit 203 as the event detecting unit, detects the point of time as the event, when the information-holding vehicle reaches an intersection after the non-equipped-vehicle information providing unit, provides the non-equipped vehicle information to the information-holding vehicles.

As in FIG. 30, FIG. 31 shows transit routes through Intersection Hanamachi 1 and the like. In FIG. 30, the vehicle 1 and the vehicle 2 whose destinations are different from each other, are identified as information-holding vehicles. The information of the non-equipped vehicle 3 is provided to the vehicle 1 and the vehicle 2. The vehicle 1, the vehicle 2, and the non-equipped vehicle 3 then keep traveling for a while. In FIG. 31, the vehicle 1 passes through Intersection Hanamachi 1 and Intersection Urabana 2, and then reaches Intersection Hanamachi 3. On the other hand, the vehicle 2 passes through Intersection Hanamachi 1, turns to the right at Intersection Urabana 2, and travels straight ahead through Intersection Urabana 4. In this case, the non-equipped vehicle 3 travels straight ahead and reaches Intersection Hanamachi 3. In FIG. 30, the vehicle 1 and the vehicle 2 holds the non-equipped vehicle information. However, in the situation shown in FIG. 31, where the vehicle 1, the vehicle 2, and the non-equipped vehicle 3 then keep traveling for a while, the vehicle 3 is not present in a rearward position of the vehicle 2 when the vehicle 2 reaches Intersection Urabana 4. This means that the non-equipped vehicle information held by the vehicle 2 becomes unnecessary. Therefore, the vehicle 2 deletes the non-equipped vehicle information. On the other hand, the vehicle 3 is present in a rearward position of the vehicle 1 when the vehicle 1 reaches Intersection Hanamachi 3. Therefore, the vehicle 1 once again holds the non-equipped vehicle information which the vehicle 1 has held so far. However, since the distance and the like, between the vehicle 1 and the vehicle 3 possibly change in the meantime, the distance and the like have to be modified.

Under an environment in which vehicle-to-vehicle communication is carried out, vehicles often communicate with one another particularly at an intersection. At an intersection, the amount of the accumulated information becomes enormous, which means that the information amount has to be reduced. Not by providing the non-equipped vehicle information again, for example, but by updating only changeable factors such as vehicle-to-vehicle distance and speed, while by continuously holding unchangeable factors such as vehicle ID and appearance information, this example has the advantage that the communication capacity can be saved.

Modified Example 2

The information about the appearance of the non-equipped vehicle (referred to as appearance information) can be detected to make a notification.

In the second and first embodiments, based on the moving directions of the equipped and non-equipped vehicles, and on the predicted and estimated destinations thereof, the matching degree of destinations is determined to identify the information-holding vehicle for holding the information indicating the presence of the non-equipped vehicle, thereby supporting safety traveling. Under an environment in which vehicle-to-vehicle communication is widely available, for example, functions including the function of avoiding the collision with a vehicle appearing from a dead angle, are performed through vehicle-to-vehicle communication. However, these functions are performed only between vehicles equipped with a vehicle-to-vehicle communication module. This does not mean that a collision with a vehicle having no communication module (referred to as a non-equipped vehicle in the present invention) can be avoided. Accordingly, as described in the forgoing embodiments, the vehicle for holding the non-equipped vehicle information is identified (referred to as an information-holding vehicle) so that the non-equipped vehicle information is notified through the information-holding vehicle. This can avoid a collision with the non-equipped vehicle.

Furthermore, not only the presence of the non-equipped vehicle, but also the non-equipped vehicle appearance information, are detected. By notifying the appearance information, the equipped vehicle can grasp movement of the non-equipped vehicle more easily, thereby avoiding the collision particularly effectively. Hereinafter, a description is given with reference to the drawings.

Figure 32:
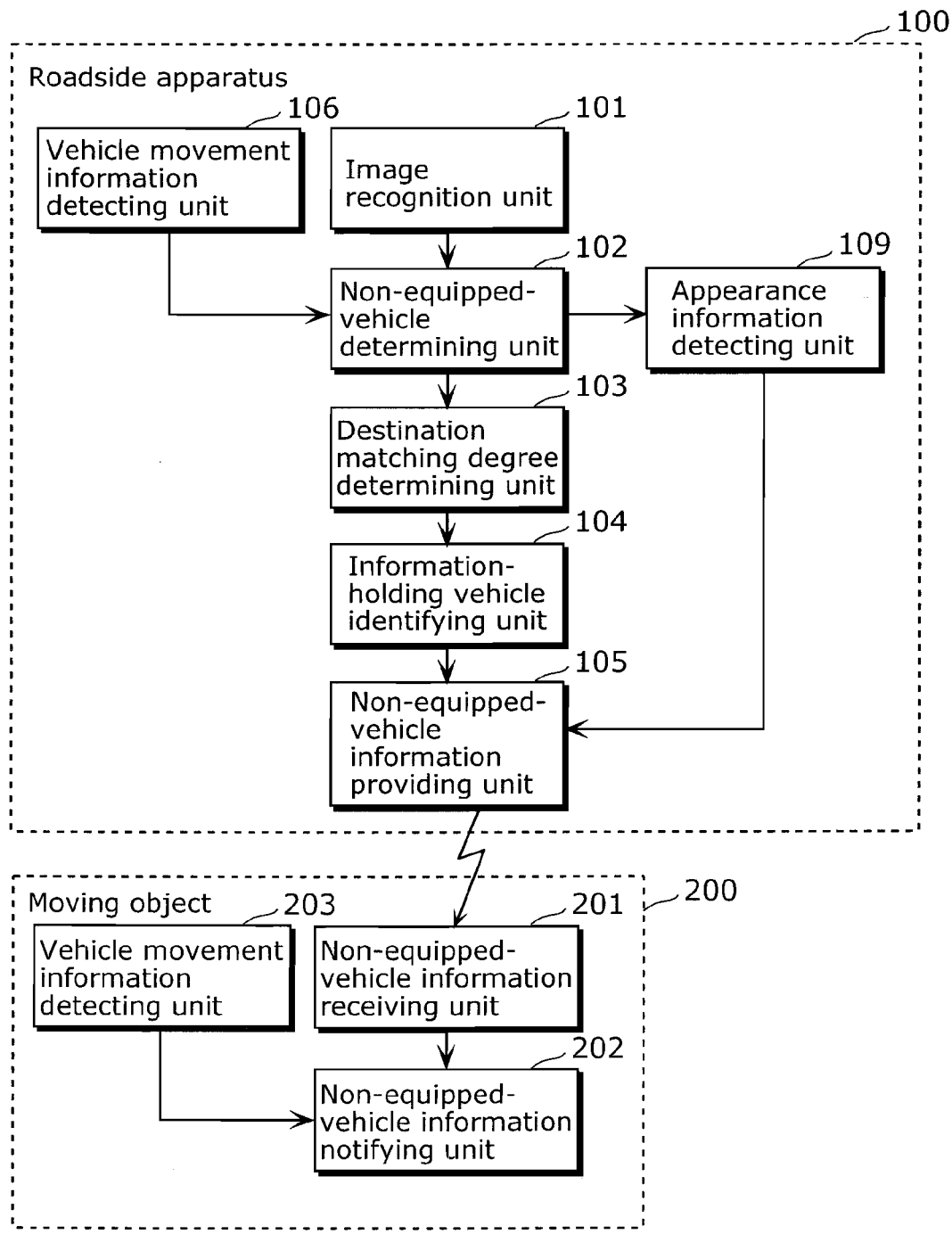
FIG. 32 is a block diagram showing the configuration of a travel support system according to a modified example 2 of the second embodiment.

FIG. 32 is a block diagram showing the configuration of the travel support system according to the modified example 2 of the second embodiment. In addition to the constituent elements described in the first embodiment, an appearance information detecting unit 109 is provided. The appearance information detecting unit 109 is an exemplary appearance information detecting unit which generates appearance information based on the moving image obtained by the image recognition unit 101. The appearance information indicates the apparent characteristics of the non-equipped vehicle. The appearance information detecting unit 109 detects the vehicle appearance characteristics such as body color, size, and model. On the other hand, the non-equipped-vehicle information providing unit 105 is an exemplary non-equipped-vehicle information providing unit. The non-equipped-vehicle information providing unit 105 provides the appearance information generated by the appearance information detecting unit, to the information-holding vehicle, as the non-equipped vehicle information. The appearance information detecting unit 109 is an exemplary appearance information detecting unit. The appearance information detecting unit 109 generates the appearance information from at least one of the body color, the shape, the size, and the model of the non-equipped vehicle, based on the moving image.

Figure 33:
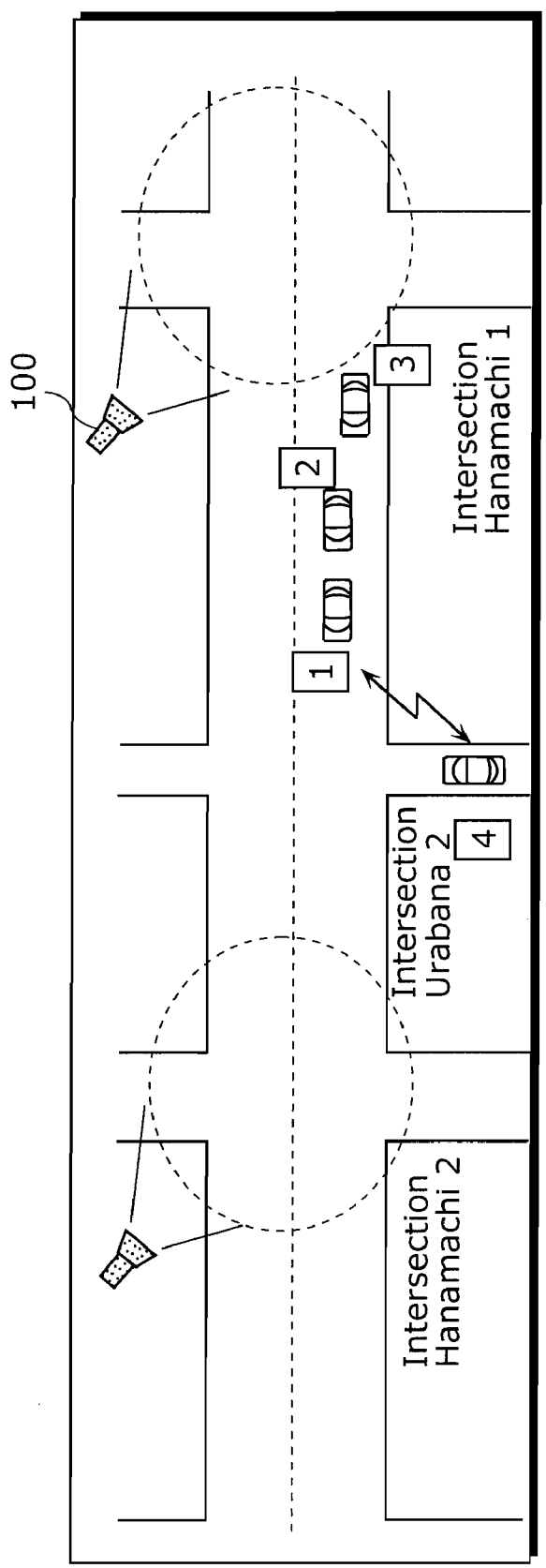
FIG. 33 shows an example in which the information-holding vehicle provides the non-equipped vehicle information to another equipped vehicle to notify the presence of the non-equipped vehicle.

FIG. 33 shows an example in which the information-holding vehicle provides the non-equipped vehicle information to another equipped vehicle to notify the presence of the non-equipped vehicle. For example, in FIG. 33, the roadside apparatus 100 detects an equipped vehicle 1 and an equipped vehicle 2. The roadside apparatus 100 also detects a vehicle 3 as a non-equipped vehicle. The roadside apparatus 100 notifies the vehicles 1 and 2 that the non-equipped vehicle is present. As described above, through the vehicle 1 and the vehicle 2, a collision between an equipped vehicle 4 and the non-equipped vehicle indicated by the non-equipped vehicle information can be avoided.

Figure 34:
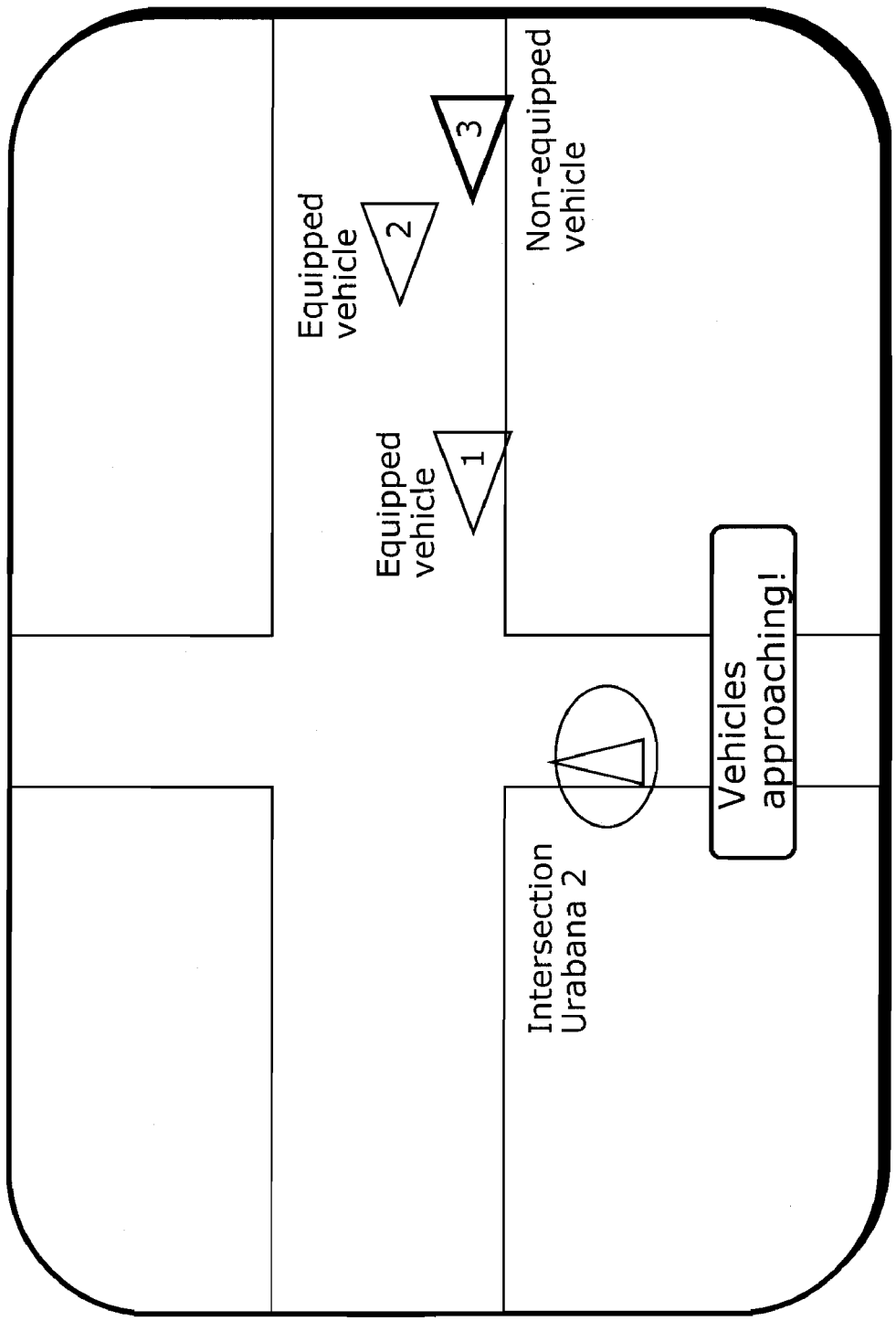
FIG. 34 shows an example in which the non-equipped vehicle information received from the information-holding vehicle is displayed by an equipped vehicle.

However, for the vehicle 4, which has received the information, only the presence or absence of the non-equipped vehicle is not always sufficient. FIG. 34 shows an example in which the non-equipped vehicle information received from the information-holding vehicle is displayed by the equipped vehicle. For example, FIG. 34 shows a display screen of the vehicle 4. According to the display screen, the vehicle 1, the vehicle 2, and the vehicle 3 are approaching, and the vehicle 3 is a non-equipped vehicle. In reality, GPS position information may have an error. The position of each vehicle and the position of the real non-equipped vehicle do not always match each other. For example, even when the non-equipped vehicle 3 is found in a rearward position of the equipped vehicle 2 on the screen, the non-equipped vehicle 3 may actually be positioned in a rearward position of the equipped vehicle 1, and in a frontward position of the equipped vehicle 2. The vehicle 4 cannot communicate with the non-equipped vehicle through vehicle-to-vehicle communication. In this case, the vehicle 4 intends to travel straight ahead after the non-equipped vehicle passes through. The real problem is that the vehicle 4 cannot determine which vehicle is a non-equipped vehicle. In response to this problem, the appearance information detecting unit 109 can detect the vehicle appearance characteristics to make a notification together with the appearance characteristics. Furthermore, since a difficulty is found in recognizing the body color of each vehicle, characteristics recognizable even at nighttime such as the shape and the number of the head lamps can be employed as the appearance characteristics.

When the non-equipped vehicle appearance information is notified to another equipped vehicle in the form of a photograph, a gradation or mosaic may be applied to specific portions corresponding to the number plate and the face of each person riding in the non-equipped vehicle. This application is performed from the viewpoint of the protection of the privacy of each person who rides in a non-equipped vehicle.

Figure 35:
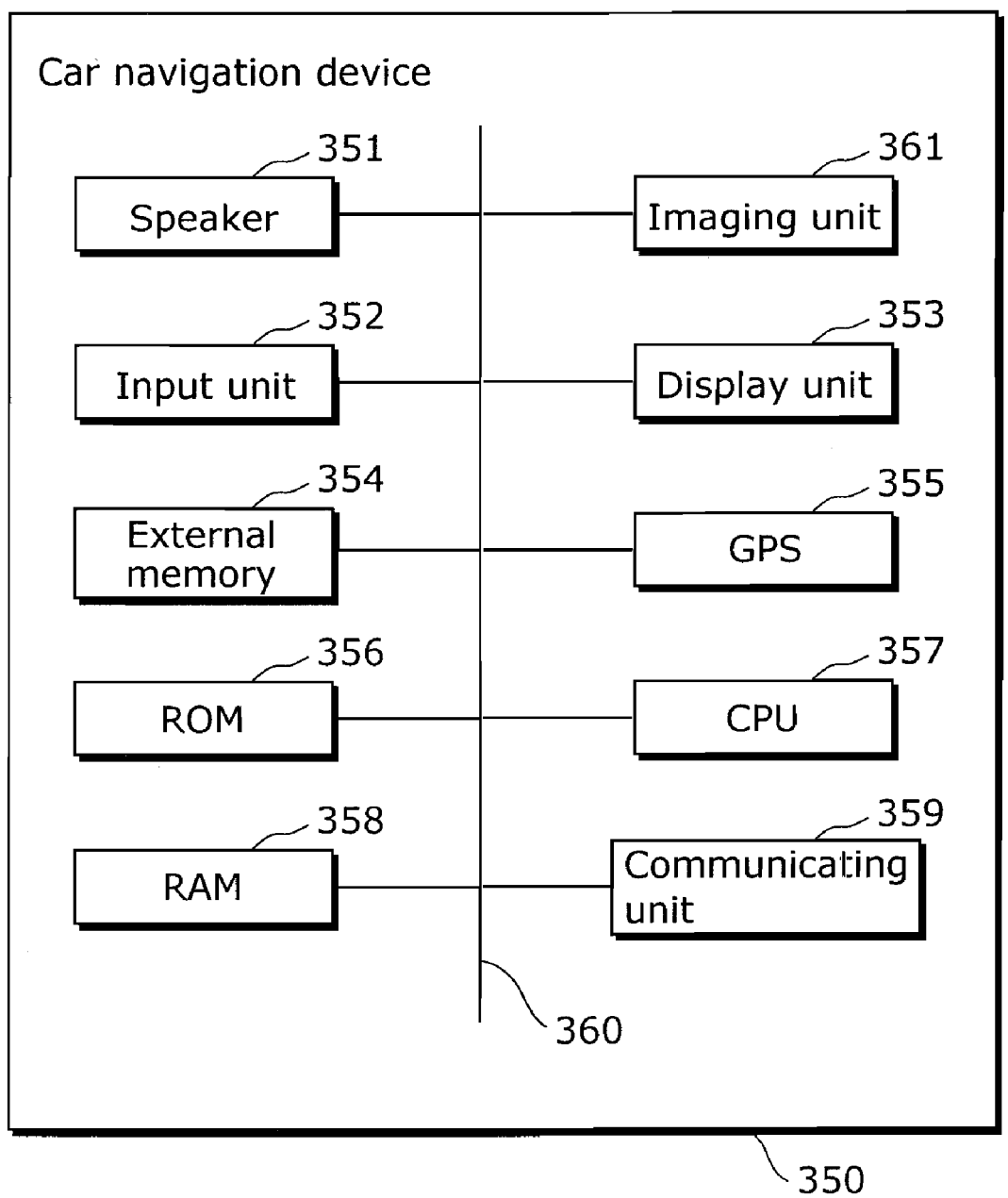
FIG. 35 is a block diagram showing an exemplary hardware structure of a car navigation device included in a moving object capable of performing vehicle-to-vehicle communication according to the present invention.

FIG. 35 is a block diagram showing an exemplary hardware structure of a car navigation device included in the moving object capable of performing vehicle-to-vehicle communication according to the present invention. As shown in the figure, a car navigation device 350 according to the present invention includes: a speaker 351; an input unit 352; a display unit 353; an external memory 354; a GPS 355; a ROM (Read Only Memory) 356; a CPU (Central Processing Unit, or processor) 357; a RAM (Random Access Memory) 358; a communicating unit 359; a bus 360; and an imaging unit 361.

The speaker 351 outputs synthetic voice to provide guidance on the use of the input unit 352 for setting a destination, current position information, and the like. The input unit 352, which includes a touch panel and operation buttons, allows the user to input a search keyword and to set a destination therethrough. The display unit 353, which includes a liquid crystal display, displays the route to the set destination, information about the predicted destination of another vehicle, and the like. The external memory 354 is a bulk memory such as a hard disk, a DVD, or an IC card. The external memory 354 stores map information, movement histories, and the like. The external memory 354 further stores a program to be loaded into the RAM 358 for execution after the car navigation device 350 is started. The GPS 355 obtains the current position (latitude and longitude) of a moving object by using an electric wave from a GPS satellite. The ROM 356 is a nonvolatile, read-only, semiconductor memory. The ROM 356 stores a program such as a program for starting the car navigation device 350. The CPU 357 executes the programs stored in the ROM 356 and the RAM 358, so as to implement each unit in the moving object shown in the block diagram of FIG. 1, FIG. 16, FIG. 19, FIG. 32, and FIG. 36 to be described later, and to implement not shown each unit in the car navigation device 350. The RAM 358 is a volatile semiconductor memory that can write and read data. The RAM 358 provides a work area by supplying the loaded program to the CPU 357 after the car navigation device 350 is started, as well as by holding data during processing in CPU 357. The communicating unit 359 serves as a communicating unit for vehicle-to-vehicle communication, using the non-equipped-vehicle information receiving unit 201, the non-equipped-vehicle information notifying unit 202 shown in FIG. 1 and FIG. 16, and the non-equipped-vehicle information providing unit 105 shown in FIG. 36. The communicating unit 359 also serves as a communicating unit using the Vehicle Information and Communication System (VICS). The communicating unit 359 then transmits and receives data via infrared communication, local wireless communication, or the like. The bus 360 is a parallel data transmission line included in the car navigation device 350, which allows data transmission between units. The imaging unit 361 is a wide-angle camera or an all-around camera mounted on the moving object. The imaging unit 361 captures images of a vehicle around the camera-mounted moving object.

Figure 36:
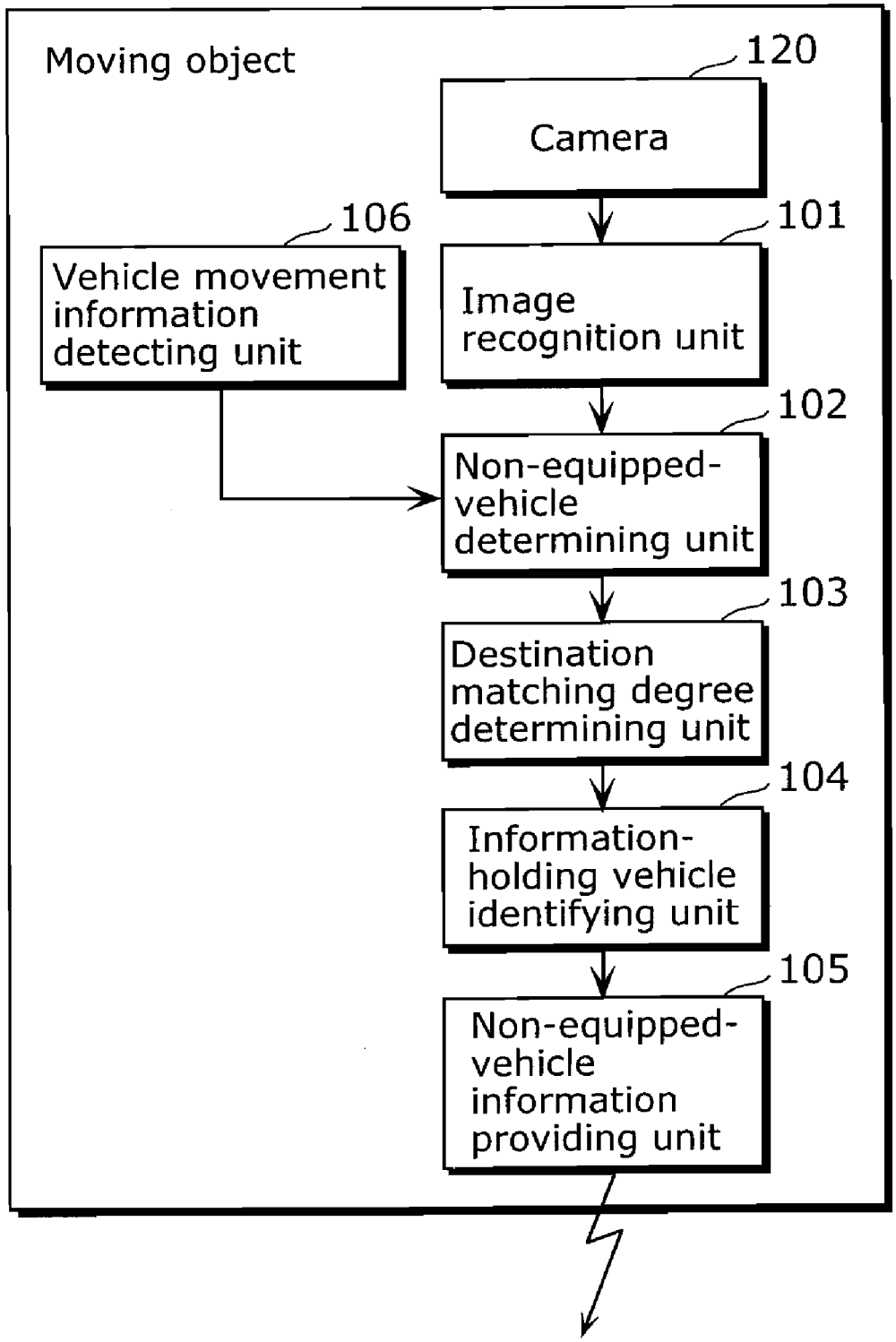
FIG. 36 is a block diagram showing the configuration of a moving object capable of performing the same process as the roadside apparatus according to the present invention.

In the embodiment, the roadside apparatus 100 includes an intersection camera. The vehicle images captured by the camera are recognized by the image recognition unit 101. Whether or not each vehicle is an equipped vehicle, is determined by determining whether or not the recognized each vehicle position and the position information received through vehicle-to-vehicle communication match each other. However, the present invention is not limited to this case. For example, a vehicle equipped with a vehicle-to-vehicle communication module, including a camera, can perform the same function as the roadside apparatus 100. FIG. 36 is a block diagram showing the configuration of a moving object capable of performing the same process as the roadside apparatus shown in FIG. 1. As shown in the figure, the moving object includes: a camera 120; an image recognition unit 101; a non-equipped-vehicle determining unit 102; a destination matching degree determining unit 103; an information-holding vehicle identifying unit 104; a non-equipped-vehicle information providing unit 105; and a vehicle movement information detecting unit 106. The camera 120 is an exemplary imaging unit for capturing an image of each vehicle. A wide-angle camera or an all-around camera is employed for the camera 120. The camera 120 captures an image of another moving object positioned around the moving object. The image recognition unit 101 recognizes the images of the moving objects captured by the camera 120 and the positions of the moving objects. The non-equipped-vehicle determining unit 102 determines whether or not the position of each moving object recognized by the image recognition unit 101, and the position information detected by the vehicle movement information detecting unit 106 as a vehicle-to-vehicle communication module, match each other. When no match is found, the non-equipped-vehicle determining unit 102 determines that the moving object is a non-equipped vehicle. When a match is found, the non-equipped-vehicle determining unit 102 determines that the moving object is an equipped vehicle. The destination matching degree determining unit 103 determines the matching degree of destinations between each moving object determined as an equipped vehicle and the moving object determined as a non-equipped vehicle. The information-holding vehicle identifying unit 104 identifies the equipped vehicle having the largest matching degree with the destination of the non-equipped vehicle as the information-holding vehicle. The non-equipped-vehicle information providing unit 105 provides the non-equipped vehicle information to the identified information-holding vehicle. The vehicle movement information detecting unit 106 is an exemplary communicating unit which communicates with the communication module mounted in each vehicle. The vehicle movement information detecting unit 106 is a vehicle-to-vehicle communication module which communicates with another moving object to notify the position information of the moving object to the other moving object.

A set of the image recognition unit 101, the non-equipped-vehicle determining unit 102, the destination matching degree determining unit 103, the information-holding vehicle identifying unit 104 and the non-equipped-vehicle information providing unit 105 shows one of the examples of a processor which detects the presence and position of the equipped vehicle equipped with the communication module for communicating with another vehicle, and the presence and position the non-equipped vehicle equipped with no communication module, by using the communicating unit and the imaging unit; the exemplary processor which identifies an information-holding vehicle which is the equipped vehicle for holding non-equipped vehicle information including the information about the non-equipped vehicle position, from the detected equipped vehicles, based on the positions of the detected equipped and non-equipped vehicles; and the exemplary processor which provides the non-equipped vehicle information to the identified information-holding vehicle through the communicating unit.

Each functional block shown in the block diagrams (FIG. 1, FIG. 16, FIG. 19, FIG. 32, FIG. 36, and the like) is generally implemented as a large-scale integrated (LSI) circuit. Each functional block may be implemented on a single chip. Alternatively, all the functional blocks or some thereof may be implemented in the form of a single chip.

For example, the functional blocks except memory may be implemented in the form of a single chip. Although, referred to as LSI here, it may also be referred to as an IC, system LSI, super LSI, and ultra-LSI, depending on the degree of integration.

Furthermore, the technique for implementation as an integrated circuit is not limited to an LSI. Implementation through a purpose-built circuit or a general-purpose processor is also possible. It is also possible to employ a Field Programmable Gate Array (FPGA) which can be programmed, and a reconfigurable processor in which connections and settings of circuit cells within an LSI can be reconfigured, even after manufacturing the LSI.

In addition, when integrated circuit technology replacing the LSI appears as a result of developments in semiconductor technology or as an offshoot of different technology, it goes without saying that integration of the function blocks can be carried out employing such technology. Biotechnology or the like is likely to be applied to this field.

Furthermore, out of the functional blocks, a unit for storing the data to be encoded or decoded may be implemented separately, not implemented in the same single chip.

The present invention is useful as a system which provides information about a collision which may occur between vehicles. For example, the system is included in a car navigation device or a mobile terminal. The system identifies an information-holding vehicle for holding non-equipped vehicle information to notify the non-equipped vehicle information through the information-holding vehicle. This can avoid a collision with another vehicle. The present invention can thus be used as a vehicle collision information notifying system.

The invention claimed is:

1. A travel support system comprising:
a roadside apparatus; and
a plurality of equipped vehicles, each equipped vehicle of said plurality of equipped vehicles being equipped with a respective communication module for communicating with another vehicle,
wherein said roadside apparatus includes:
an equipped-vehicle detecting unit operable to detect a presence and a position of each equipped vehicle of said plurality of equipped vehicles;
a non-equipped-vehicle detecting unit operable to detect a presence and a position of a non-equipped vehicle that is not equipped with a respective communication module;
an information-holding vehicle identifying unit operable to identify an information-holding vehicle, which is one equipped vehicle of said plurality of equipped vehicles detected by said equipped-vehicle detecting unit and which is for holding non-equipped-vehicle information including the position of the non-equipped vehicle, the information-holding vehicle being identified based on (i) the position of each equipped vehicle of said plurality of equipped vehicles detected by said equipped-vehicle detecting unit, and (ii) the position of the non-equipped vehicle detected by said non-equipped-vehicle detecting unit; and
a non-equipped-vehicle information providing unit operable to provide the non-equipped-vehicle information to the information-holding vehicle identified by said information-holding vehicle identifying unit, and
wherein the information-holding vehicle holds the non-equipped-vehicle information provided by said non-equipped-vehicle information providing unit of said roadside apparatus, and provides the held non-equipped-vehicle information to another equipped vehicle of said plurality of equipped vehicles via the respective communication module included therein.

2. The travel support system according to claim 1,
wherein said roadside apparatus includes a destination matching degree determining unit operable to determine, for each respective equipped vehicle of said plurality of equipped vehicles, a respective degree of matching between (i) a respective destination of the respective equipped vehicle of said plurality of equipped vehicles and (ii) a destination of the non-equipped vehicle, each respective degree of matching being determined based on the position of the respective equipped vehicle of said plurality of equipped vehicles detected by said equipped-vehicle detecting unit and the position of the non-equipped vehicle detected by said non-equipped-vehicle detecting unit, and
wherein said information-holding vehicle identifying unit identifies, as the information-holding vehicle, one equipped vehicle of said plurality of equipped vehicles for which said destination matching degree determining unit determines that the respective degree of matching is highest.

3. The travel support system according to claim 2,
wherein said equipped-vehicle detecting unit detects a respective moving direction of each equipped vehicle of said plurality of equipped vehicles,
wherein said non-equipped-vehicle detecting unit detects a moving direction of the non-equipped vehicle, and
wherein said destination matching degree determining unit determines that the respective degree of matching between the respective destination of the one equipped vehicle of said plurality of equipped vehicles and the destination of the non-equipped vehicle is the highest, when the respective moving direction of the one equipped vehicle of said plurality of equipped vehicles detected by said equipped-vehicle detecting unit and the moving direction of the non-equipped vehicle detected by said non-equipped-vehicle detecting unit match.

4. The travel support system according to claim 2,
wherein said roadside apparatus includes:
a vehicle movement history storing unit which stores movement histories of each equipped vehicle of said plurality equipped vehicles and the non-equipped vehicle, the movement histories being stored based on the position of each equipped vehicle of said plurality of equipped vehicles detected by said equipped-vehicle detecting unit and the position of the non-equipped vehicle detected by said non-equipped-vehicle detecting unit; and
a destination predicting unit operable to predict the respective destination of each equipped vehicle of said plurality of equipped vehicles and the destination of the non-equipped vehicle, based on the movement histories of said plurality of equipped vehicles and the non-equipped vehicle stored in said vehicle movement history storing unit, and wherein said destination matching degree determining unit determines the respective degree of matching for each respective equipped vehicle of said plurality of equipped vehicles based on the respective destination of each respective equipped vehicle of said plurality of equipped vehicles and the destination of the non-equipped vehicle predicted by said destination predicting unit.

5. The travel support system according to claim 2,
wherein said equipped-vehicle detecting unit detects a respective lane through which each equipped vehicle of said plurality of equipped vehicles passes,
wherein said non-equipped-vehicle detecting unit detects a lane through which the non-equipped vehicle passes, and
wherein said destination matching degree determining unit determines that the respective degree of matching between the respective destination of the one equipped vehicle of said plurality of equipped vehicles and the destination of the non-equipped vehicle is the highest, when the respective lane of the one equipped vehicle of said plurality of equipped vehicles detected by said equipped-vehicle detecting unit and the lane of the non-equipped vehicle detected by said non-equipped-vehicle detecting unit match.

6. The travel support system according to claim 2,
wherein said equipped-vehicle detecting unit detects a respective turn signal given by a respective direction indicator of each equipped vehicle of said plurality of equipped vehicles,
wherein said non-equipped-vehicle detecting unit detects a turn signal given by a direction indicator of the non-equipped vehicle, and
wherein said destination matching degree determining unit determines that the respective degree of matching between the respective destination of the one equipped vehicle of said plurality of equipped vehicles and the destination of the non-equipped vehicle is the highest, when the respective turn signal of the one equipped vehicle of said plurality of equipped vehicles detected by said equipped-vehicle detecting unit and the turn signal of the non-equipped vehicle detected by said non-equipped-vehicle detecting unit match.

7. The travel support system according to claim 1, wherein said roadside apparatus includes:
an event detecting unit operable to detect an event for deleting the non-equipped-vehicle information held by the information-holding vehicle; and
a deleting unit operable to delete the non-equipped-vehicle information held by the information-holding vehicle, when said event detecting unit detects the event.

8. The travel support system according to claim 7, wherein said event detecting unit detects, as the event, a point in time after said non-equipped-vehicle information providing unit provides the non-equipped-vehicle information to the information-holding vehicle and when the information-holding vehicle enters an intersection.

\* \* \* \* \*